US012614565B2

(12) United States Patent
Takahashi et al.

(10) Patent No.: US 12,614,565 B2
(45) Date of Patent: Apr. 28, 2026

(54) MAGNETIC RECORDING MEDIUM

(71) Applicants: Sony Group Corporation, Tokyo (JP);
**NATIONAL INSTITUTE OF
ADVANCED INDUSTRIAL
SCIENCE AND TECHNOLOGY**,
Tokyo (JP)

(72) Inventors: Takeshi Takahashi, Tokyo (JP);
Katsunori Maeshima, Tokyo (JP);
Minoru Yamaga, Tokyo (JP); **Masaru
Terakawa, Tokyo (JP); Natsuki Ichise**,
Tokyo (JP); Tomoe Sato, Tokyo (JP);
Takashi Kataguchi, Tokyo (JP);
Atsuya Towata, Tokyo (JP); **Kimihiro
Ozaki, Tokyo (JP); Akihiro
Matsumoto**, Tokyo (JP)

(73) Assignee: Sony Group Corporation, Tokyo (JP)

( * ) Notice: Subject to any disclaimer, the term of this
patent is extended or adjusted under 35
U.S.C. 154(b) by 492 days.

(21) Appl. No.: 17/789,685

(22) PCT Filed: Jan. 20, 2021

(86) PCT No.: PCT/JP2021/001829
§ 371 (c)(1),
(2) Date: Jun. 28, 2022

(87) PCT Pub. No.: WO2021/149716
PCT Pub. Date: Jul. 29, 2021

(65) Prior Publication Data
US 2023/0075546 A1    Mar. 9, 2023

(30) Foreign Application Priority Data

Jan. 21, 2020    (JP) ................................. 2020-007832

(51) Int. Cl.
*G11B 5/706* (2006.01)
*G11B 5/714* (2006.01)

(52) U.S. Cl.
CPC .......... *G11B 5/70642* (2013.01); *G11B 5/714* (2013.01)

(58) Field of Classification Search
None
See application file for complete search history.

(56) References Cited

U.S. PATENT DOCUMENTS

| | | | | |
|---|---|---|---|---|
| 2009/0046396 A1* | 2/2009 | Nagata | ..................... | G11B 5/70 |
| 2019/0103133 A1* | 4/2019 | Ozawa | ............... | G11B 5/70678 |

(Continued)

FOREIGN PATENT DOCUMENTS

| | | | | | |
|---|---|---|---|---|---|
| CN | 108117102 A | * | 6/2018 | ............ | B22F 1/0059 |
| JP | 2008189996 A | | 8/2008 | | |

(Continued)

OTHER PUBLICATIONS

International Search Report from corresponding PCT application PCT/JP2021/001829, dated Apr. 20, 2021.

*Primary Examiner* — Tamra L. Dicus
(74) *Attorney, Agent, or Firm* — K&L Gates LLP

(57) ABSTRACT

Provided is a magnetic recording medium that is able to achieve both an improvement in electromagnetic conversion characteristics and ensuring of high long-term reliability. The magnetic recording medium includes a magnetic layer and a base. The magnetic layer includes magnetic powders including ε-iron oxide. A ratio (Hrp/Hc) of residual coercivity (Hrp) measured in a perpendicular direction of the magnetic recording medium with use of a pulse magnetic field to perpendicular coercivity (Hc) of the magnetic (Continued)

recording medium is 2.0 or less. Saturation magnetization (Mst) per unit area of the magnetic recording medium is 4.5 mA or greater.

14 Claims, 5 Drawing Sheets

(56)               References Cited

U.S. PATENT DOCUMENTS

| | | |
|---|---|---|
| 2019/0304496 A1 | 10/2019 | Fujimoto |
| 2020/0066302 A1 | 2/2020 | Terakawa et al. |
| 2022/0172742 A1 | 6/2022 | Sekiguchi et al. |

FOREIGN PATENT DOCUMENTS

| | | |
|---|---|---|
| JP | 2019023950 A | 2/2019 |
| JP | 2019175532 A | 10/2019 |
| JP | 6624332 B1 | 12/2019 |
| WO | 2018203468 A1 | 11/2018 |

* cited by examiner

[ FIG. 1 ]
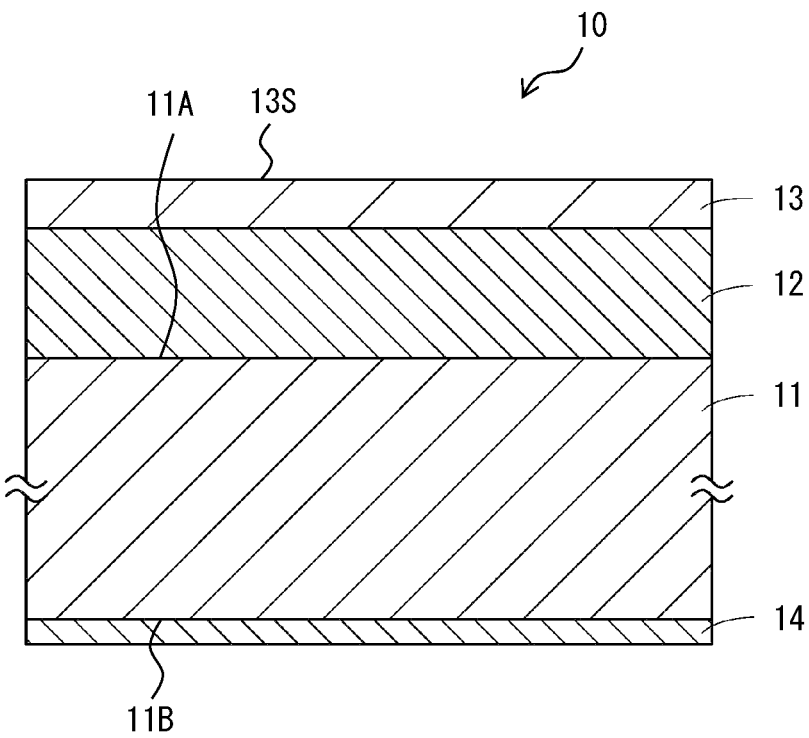
[ FIG. 2 ]
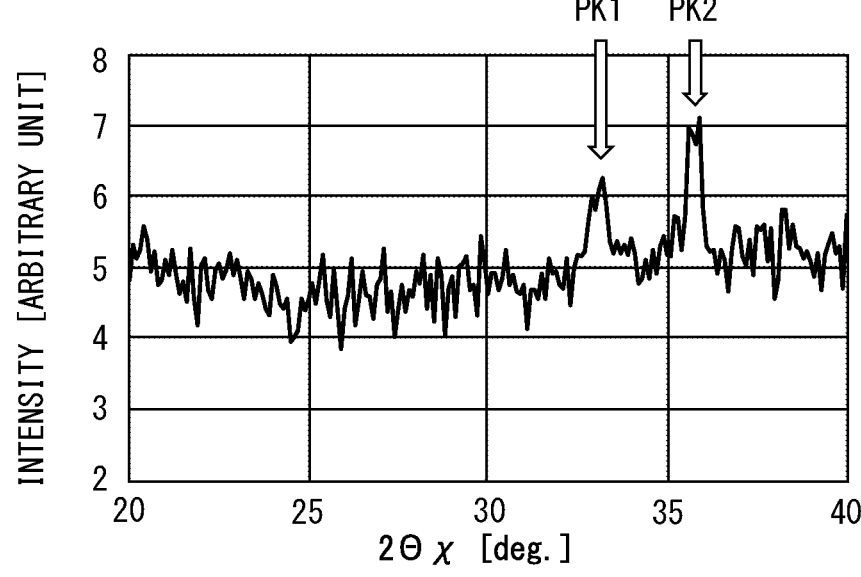

[ FIG. 3A ]
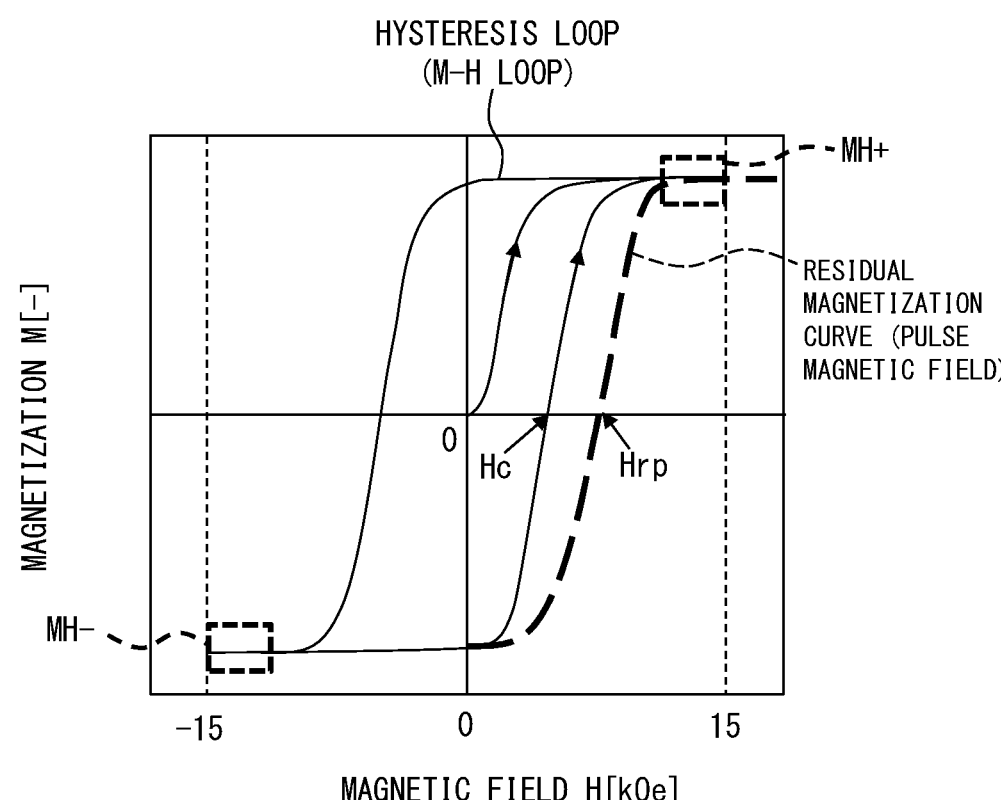

[ FIG. 3B ]
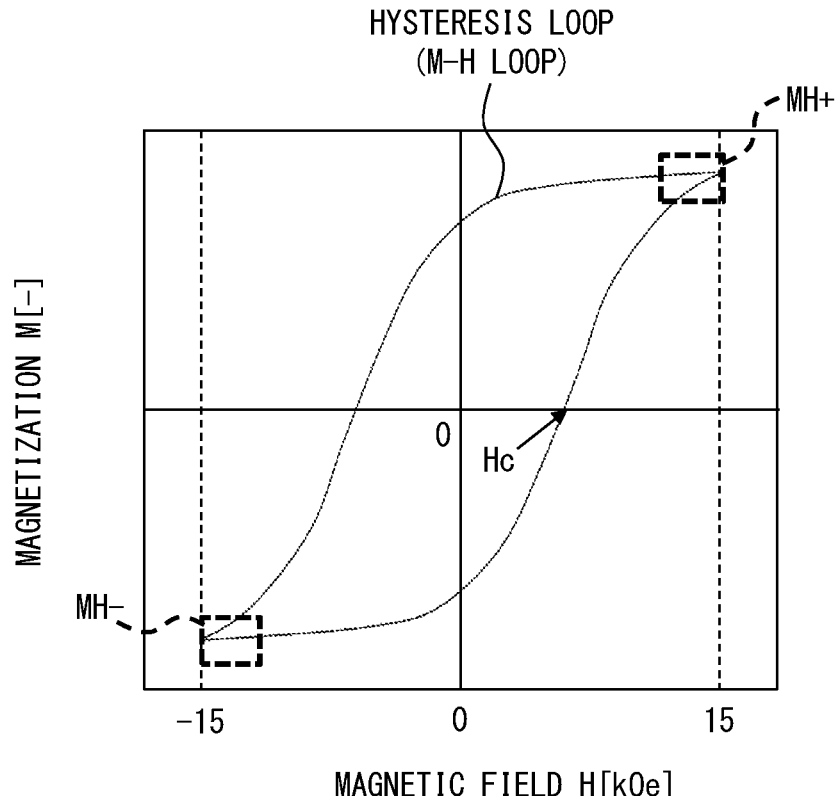
[ FIG. 4 ]
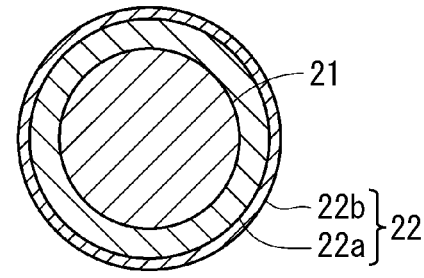

[ FIG. 5 ]
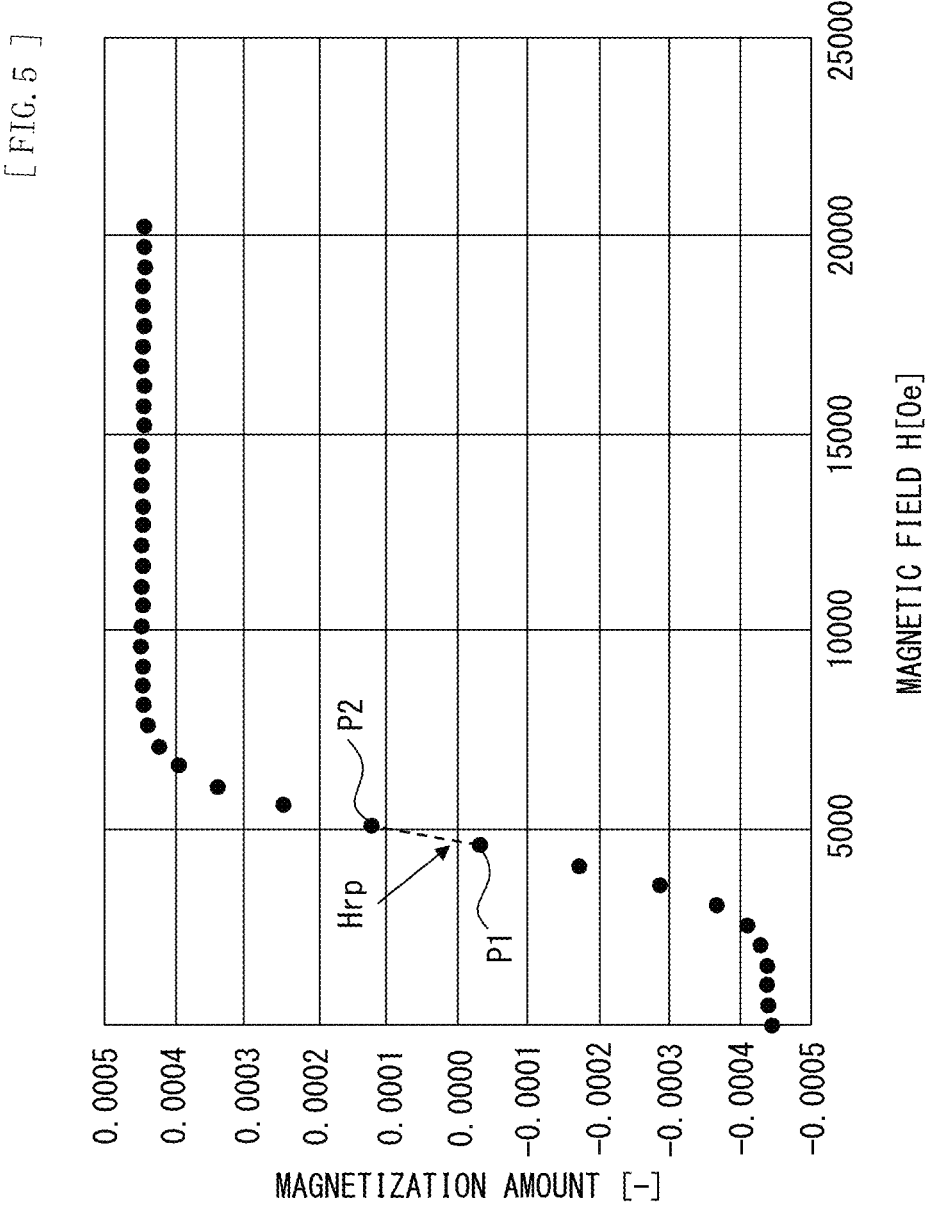

[ FIG. 6 ]
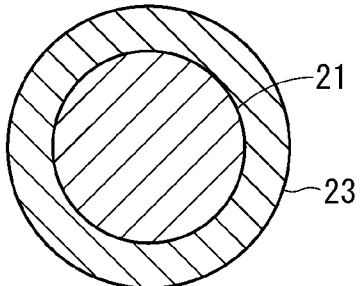
[ FIG. 7 ]
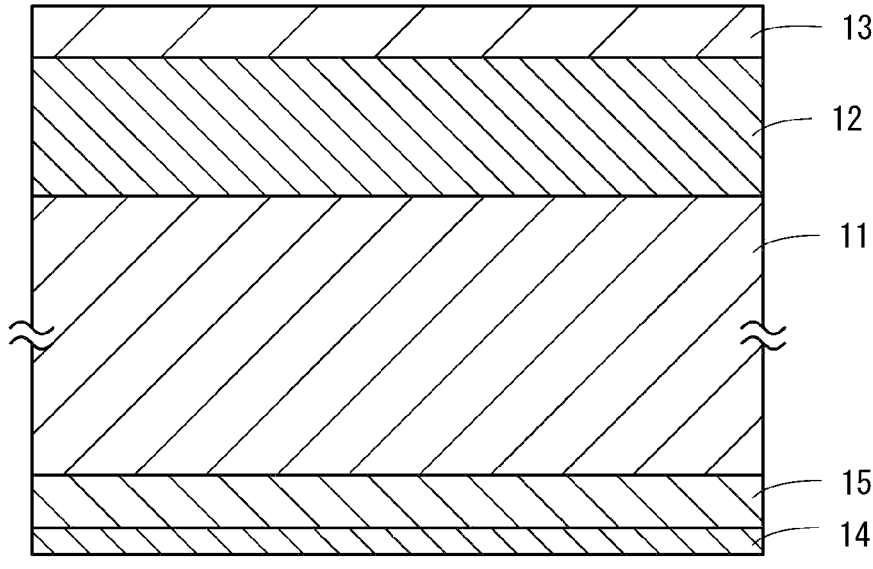

MAGNETIC RECORDING MEDIUM

TECHNICAL FIELD

The present disclosure relates to a magnetic recording medium.

BACKGROUND ART

A tape-like magnetic recording medium has been widely used to store electronic data. For example, PTL 1 proposes a magnetic recording medium having excellent electromagnetic conversion characteristics in a high-temperature environment.

CITATION LIST

Patent Literature

PTL 1: International Publication No. WO2018/203468

SUMMARY OF THE INVENTION

Incidentally, such a tape-like magnetic recording medium is expected to have high long-term reliability while improving electromagnetic conversion characteristics.

It is therefore desirable to provide a magnetic recording medium that is able to achieve both an improvement in electromagnetic conversion characteristics and ensuring of high long-term reliability.

A magnetic recording medium according to an embodiment of the present disclosure includes a magnetic layer and a base. The magnetic layer includes magnetic powders including ε-iron oxide. A ratio (Hrp/Hc) of residual coercivity (Hrp) measured in a perpendicular direction of the magnetic recording medium with use of a pulse magnetic field to perpendicular coercivity (Hc) of the magnetic recording medium is 2.0 or less. Saturation magnetization (Mst) per unit area of the magnetic recording medium is 4.5 mA or greater.

In the magnetic recording medium according to the embodiment of the present disclosure has the configuration described above, which makes it possible to achieve both an improvement in electromagnetic conversion characteristics and an improvement in thermal stability.

BRIEF DESCRIPTION OF THE DRAWINGS

FIG. 1 is a cross-sectional view of a magnetic recording medium according to an embodiment of the present disclosure.

FIG. 2 schematically illustrates an example of a diffraction pattern measured by in-plane X-ray diffraction (with a Cu tube) in a magnetic layer illustrated in FIG. 1.

FIG. 3A illustrates an example of a magnetization curve (M-H loop) in the magnetic layer illustrated in FIG. 1.

FIG. 3B illustrates an example of a magnetization curve (M-H loop) in a magnetic layer as a reference example.

FIG. 4 is a schematic cross-sectional view of a cross-sectional configuration of an ε-iron oxide particle included in the magnetic layer illustrated in FIG. 1.

FIG. 5 is a characteristic diagram illustrating an example of a residual magnetization curve for measuring residual coercivity in the magnetic recording medium illustrated in FIG. 1.

FIG. 6 is a schematic cross-sectional view of a cross-sectional configuration of a ε-iron oxide particle as a modification example.

FIG. 7 is a cross-sectional view of a magnetic recording medium as another modification example.

MODES FOR CARRYING OUT THE INVENTION

Hereinafter, some embodiments of the present disclosure are described in detail with reference to the drawings. It is to be noted that description is given in the following order.
1. Background
2. Embodiment
   2-1. Configuration of Magnetic Recording Medium
   2-2. Method of Manufacturing Magnetic Recording Medium
   2-3. Effects
3. Modification Examples

1. Background

First, description is given of a background of creation of the technology of the present disclosure. As magnetic powders included in a magnetic layer of a magnetic recording medium, adoption of ε-iron oxide has been studied. A reason for this is that miniaturization of magnetic powders is desirable to achieve high-density recording on the magnetic recording medium, and the ε-iron oxide has high coercivity even if the ε-iron oxide is pulverized. However, mass magnetization of the ε-iron oxide is small, and output and thermal stability are therefore insufficient as the magnetic recording medium. It is to be noted that in a case where a ratio Hrp/Hc to be described later is 2.0 or less, it is possible to avoid a decrease in thermal stability. In addition, in a case where the ratio Hrp/Hc is 2.0 or less, it is possible to improve a signal attenuation rate after ten years to be described later and ensure long-term reliability. The present disclosure therefore proposes, for example, a magnetic recording medium that achieves both an improvement in electromagnetic conversion characteristics and ensuring of long-term reliability while adopting a magnetic layer including the ε-iron oxide.

2. Embodiment

[2-1 Configuration of Magnetic Recording Medium 10]

FIG. 1 illustrates a cross-sectional configuration example of a magnetic recording medium 10 according to an embodiment of the present disclosure. As illustrated in FIG. 1, the magnetic recording medium 10 includes a stacked structure in which a plurality of layers are stacked. Specifically, the magnetic recording medium 10 includes an elongated tape-like base 11, an underlayer 12 provided on one main surface 11A of the base 11, a magnetic layer 13 provided on the underlayer 12, and a back layer 14 provided on another main surface 11B of the base 11. The magnetic layer 13 has a surface 13S on which a magnetic head is to travel while being in contact with the surface 13S. It is to be noted that the underlayer 12 and the back layer 14 are provided as needed basis, or may be omitted. It is to be noted that the magnetic recording medium 10 preferably has an average thickness of 5.6 μm or less, for example.

The magnetic recording medium 10 has an elongated tape-like shape, and is to travel along its longitudinal direction in recording and reproducing operations. The magnetic recording medium 10 is preferably used in a recording and reproducing apparatus provided with a ring-type head as a recording head, for example.

(Base 11)

The base 11 is a non-magnetic supporting member that supports the underlayer 12 and the magnetic layer 13. The base 11 has an elongated film shape. The upper limit value of the average thickness of the base 11 is preferably 4.2 μm or less, more preferably 4.0 μm or less. In a case where the upper limit value of the average thickness of the base 11 is 4.2 μm or less, it is possible to increase storage capacity per data cartridge, as compared with a general magnetic recording medium. The lower limit value of the average thickness of the base 11 is preferably 3 μm or greater, more preferably 3.2 μm or greater. In a case where the lower limit value of the average thickness of the base 11 is 3 μm or greater, it is possible to suppress a decrease in strength of the base 11.

The average thickness of the base 11 is determined as follows. First, the magnetic recording medium 10 having a width of ½ inches is prepared, and cut into a length of 250 mm to produce a sample. Thereafter, the layers of the sample except for the base 11, i.e., the underlayer 12, the magnetic layer 13, and the back layer 14 are removed with a solvent, such as MEK (methyl ethyl ketone) or dilute hydrochloric acid. Thereafter, a measuring apparatus, Laser Hologage (LGH-110C) manufactured by Mitutoyo Corporation, is used to measure the thickness of the base 11 as the sample at five points or more. Thereafter, these measurement values are simply averaged (arithmetically averaged) to calculate an average thickness of the base 11. It is to be noted that the measurement points are randomly selected on the sample.

The base 11 includes polyesters as a primary constituent, for example. Alternatively, the base 11 may include PEEK (polyether ether ketone) as the primary constituent. The base 11 may include at least one of polyolefins, cellulose derivatives, vinyl-based resins, or other polymeric resins, in addition to polyesters or PEEK. In a case where the base 11 includes two or more of the materials described above, the two or more materials may be mixed, copolymerized, or stacked.

The polyesters included in the base 11 include, for example, at least one of PET (polyethylene terephthalate), PEN (polyethylene naphthalate), PBT (polybutylene terephthalate), PBN (polybutylene naphthalate), PCT (polycyclohexylene dimethylene terephthalate), PEB (polyethylene-p-oxybenzoate), or polyethylene bisphenoxycarboxylate.

The polyolefins included in the base 11 include, for example, at least one of PE (polyethylene) or PP (polypropylene). The cellulose derivatives include, for example, at least one of cellulose diacetate, cellulose triacetate, CAB (cellulose acetate butyrate), or CAP (cellulose acetate propionate). The vinyl-based resins include, for example, at least one of PVC (polyvinyl chloride) or PVDC (polyvinylidene chloride).

Other polymeric resins included in the base 11 include, for example, at least one of PA (polyamide, nylon), aromatic PA (aromatic polyamide, aramid), PI (polyimide), aromatic PI (aromatic polyimide), PAI (polyamideimide), aromatic PAI (aromatic polyamideimide), PBO (polybenzoxazole, for example, Zylon (Registered Trademark)), polyether, PEK (polyether ketone), polyether-ester, PES (polyether sulfone), PEI (polyetherimide), PSF (polysulfone), PPS (polyphenylene sulfide), PC (polycarbonate), PAR (polyarylate), or PU (polyurethane).

(Magnetic Layer 13)

The magnetic layer 13 is a recording layer to record signals, and includes, for example, iron oxide having a ε-iron oxide phase. The magnetic layer 13 includes, for example, magnetic powders, a binder, and a lubricant. The magnetic layer 13 may further include an additive, such as conductive particles, an abrasive, and a rust inhibitor, as needed basis.

The magnetic layer 13 has the ε-iron oxide phase, thereby causes the magnetic recording medium 10 to produce a first peak PK1 at 32.9° and a second peak PK2 at 36.6° in a diffraction pattern by in-plane X-ray diffraction (with a Cu tube) as exemplified in FIG. 2, for example. It is to be noted that FIG. 2 schematically illustrates an example of a diffraction pattern of the magnetic recording medium 10 measured by in-plane X-ray diffraction (with a Cu tube). Peak positions in the diffraction pattern illustrated in FIG. 2 are analyzed with use of any analysis software attached to an X-ray diffraction (XRD) apparatus. At this time, a certain process necessary for analysis, such as averaging of obtained diffraction patterns may be performed. The first peak PK1 at 32.9° and the second peak PK2 at 36.6° are detected in the diffraction pattern by in-plane X-ray diffraction (with a Cu tube) of the magnetic layer 13, which indicates that the magnetic layer 13 has the ε-iron oxide phase. The magnetic layer 13 has high perpendicular coercivity Hc by including ε-iron oxide as magnetic powders. In-plane XRD is measured as follows. A measurement sample is prepared by cutting any data region of a magnetic tape rolled in a cartridge. A size of the cut sample is, for example, 12.65 mm×60 mm. The cut sample is attached to an amorphous glass substrate, and the glass substrate is fixed to an XRD measurement stage with use of a grease, and works necessary for measurement, such as alignment adjustment, are performed to perform in-plane XRD measurement. Measurement conditions are as follows.

Apparatus Name: Rigaku ATX-G

Tube (X-ray source): CuKα

Tube Output: 50 kV, 200 mA

Step (2θ): 0.05 degrees

Step Rate: 1.5 degree/sec

In addition, saturation magnetization Mst per unit area of the magnetic recording medium 10 is preferably 4.5 mA or greater. The saturation magnetization Mst per unit area of the magnetic recording medium 10 is 4.5 mA or greater, which makes it possible to further improve output of the magnetic recording medium 10, and consequently to achieve a favorable SNR (Signal-to-Noise Ratio). A reason for this is that as the saturation magnetization Mst per unit area of the magnetic layer 13 is increased, the output of the magnetic recording medium 10 is improved, and an influence of system noise of a magnetic head is relatively decreased. In addition, adjusting the filling amount, composition, and the like of magnetic powders included in the magnetic layer 13 makes it possible to adjust the saturation magnetization Mst per unit area of the magnetic layer 13. For example, reducing non-magnetic constituents such as a binder included in the magnetic layer 13 makes it possible to increase the saturation magnetization Mst per unit area of the magnetic layer 13. In addition, adjusting the composition of the magnetic powders such as replacing a part of iron (Fe) of a ε-iron oxide particle with an additive element such as cobalt (Co), or adjusting synthesis conditions (such as firing temperature) of the magnetic powders makes it possible to increase mass magnetization of the magnetic powders and increase the saturation magnetization Mst per unit area of the magnetic layer 13.

The saturation magnetization Mst per unit area of the magnetic layer 13 is determined as follows. First, three sheets of the magnetic recording media 10 are superimposed with double-sided tapes interposed therebetween, and then punched out by a 6.39 mm-diameter punch to prepare a measurement sample. At this time, marking is performed with any ink having no magnetism so that the longitudinal direction (traveling direction) of the magnetic recording medium is made recognizable. Thereafter, a vibrating sample magnetometer (VSM) is used to measure a M-H loop of the measurement sample (the entire magnetic recording medium 10) corresponding to the perpendicular direction (thickness direction) of the magnetic recording medium 10.

Next, acetone, ethanol, or the like is used to wipe off coating films, that is, the underlayer 12, the magnetic layer 13, the back layer 14, and the like to leave only the base 11. Then, three sheets of the obtained bases 11 are superimposed with double-sided tapes interposed therebetween, and then punched out by a 6.39 mm-diameter punch to obtain a background-correction sample (hereinafter, simply referred to as correction sample). Thereafter, the VSM is used to measure a M-H loop of the correction sample (the base 11) corresponding to the perpendicular direction of the base 11 (the perpendicular direction of the magnetic recording medium 10).

For example, a high sensitivity vibrating sample magnetometer "VSM-P7-15" manufactured by Toei Industry Co., Ltd. is used to measure the M-H loop of the measurement sample (the entire magnetic recording medium 10) and the M-H loop of the correction sample (the base 11). Measurement conditions are as follows: measurement mode: full loop, maximum magnetic field: 15 kOe, magnetic field step: 40 bits, time constant of locking amp: 0.3 sec, waiting time: 1 sec, and MH averaging number: 20.

After the two M-H loops are obtained, the M-H loop of the correction sample (the base 11) is subtracted from the M-H loop of the measurement sample (the entire magnetic recording medium 10) to perform background correction, and an M-H loop after the background correction is thereby obtained. Measurement and analysis programs attached to the "VSMP7-15" are used for calculation in the background correction.

The saturation magnetization Mst per unit area is calculated from saturation magnetization Ms (emu) of the obtained M-H loop after the background correction and an area (cm$^2$) of the measurement sample with use of the following expression.

$$Mst(mA)=Ms(emu)/area(cm^2) \times 10000$$

The area of the sample is calculated by the following expression.

$$Area(cm^2)=3.14 \times (0.639/2)^2 \times 3$$

It is to be noted that the M-H loops described above are both measured at 25° C. In addition, "demagnetizing field correction" is not performed in a case where the M-H loop is measured in the perpendicular direction of the magnetic recording medium 10.

The magnetic layer 13 has, for example, the surface 13S provided with multiple depressions. A lubricant is stored in these multiple depressions. It is preferable that the multiple depressions extend perpendicularly to the surface of the magnetic layer 13 to facilitate supply of the lubricant to the surface 13S of the magnetic layer 13. Alternatively, some of the multiple depressions may extend perpendicularly.

The upper limit value of the average thickness of the magnetic layer 13 is preferably 90 nm or less, particularly preferably 80 nm or less, more preferably 70 nm or less, still more preferably 50 nm or less. In a case where the upper limit value of the average thickness of the magnetic layer 13 is 90 nm or less and where a ring-type head is used as the recording head, it is possible to record magnetizations uniformly in the thickness direction of the magnetic layer 13, and thus to improve the electromagnetic conversion characteristics.

The lower limit value of the average thickness of the magnetic layer 13 is preferably 35 nm or greater. In a case where the upper limit value of the average thickness of the magnetic layer 13 is 35 nm or greater and where an MR-type head is used as the reproducing head, it is possible to secure the output, and thus to improve the electromagnetic conversion characteristics.

The average thickness of the magnetic layer 13 is determined as follows. First, carbon films are formed on the surface 13S of the magnetic layer 13 of the magnetic recording medium 10 and a surface 14S of the back layer 14 of the magnetic recording medium 10 by a deposition method. Thereafter, a tungsten thin film is further formed on the carbon film covering the surface 13S of the magnetic layer 13 by a deposition method. These carbon films and the tungsten film protect the sample during a thinning process to be described later.

Next, the magnetic recording medium 10 is processed through a FIB (focused ion beam) method or the like into a thin piece. In a case where the FIB method is used, the formation of the carbon films and the tungsten thin film serving as the protective films is performed as a pretreatment for observing a cross-sectional TEM image to be described later. The carbon films are formed on a magnetic layer-side surface and a back layer-side surface of the magnetic recording medium 10 by a deposition method. The tungsten thin film is then further formed on the magnetic layer-side surface by a deposition method or a sputtering method. The thinning is performed along the length direction (longitudinal direction) of the magnetic recording medium 10. That is, the thinning forms a cross-section parallel to both the longitudinal direction and the thickness direction of the magnetic recording medium 10. The cross-section of the obtained thin sample piece is observed using a transmission electron microscope (TEM) under the following conditions to obtain a TEM image. It is to be noted that magnification and acceleration voltage may be appropriately adjusted depending on the type of the apparatus.

Apparatus: TEM (H9000NAR manufactured by Hitachi, Ltd.)

Acceleration voltage: 300 kV

Magnification: 100,000 times

The obtained TEM image is then used to measure the thickness of the magnetic layer 13 at 10 points or more along the longitudinal direction of the magnetic recording medium 10. The obtained measurement values are simply averaged (arithmetically averaged) to determine the average thickness of the magnetic layer 13. It is to be noted that the measurement points are randomly selected on the sample piece.

In addition, as illustrated in FIG. 3A, a magnetization curve (M-H loop) representing a relationship between magnetization M and a magnetic field H within the magnetic layer 13 is preferably closed in a range of the magnetic field H of greater than −15 kOe and less than +15 kOe, thereby obtaining more favorable electromagnetic conversion characteristics. Here, the M-H loop being "closed" means that a portion overlapping the M-H loop is present in the magnetic field H within a range of −15 kOe to +15 kOe both inclusive, as illustrated in FIG. 3A. In an example in FIG. 3A, overlap portions are present in both an end region MH− in proximity to the magnetic field H of −15 kOe and an end region MH+ in proximity to the magnetic field H of +15 kOe in the M-H loop. In contrast, the M-H loop being "not closed" means that no portion overlapping the M-H loop is present in the magnetic field H within the range of −15 kOe to +15 kOe both inclusive, as illustrated in FIG. 3B. In an example in FIG. 3B, no overlap portion is present in both the end region MH− in proximity to the magnetic field H of −15 kOe and the end region MH+ in proximity to the magnetic field H of +15 kOe in the M-H loop. It is to be noted that FIG. 3B illustrates an example of a magnetization curve (M-H loop) representing a relationship between magnetization M and a magnetic field H in a magnetic layer as a reference example. The M-H loop being "not closed" means that perpendicular coercivity Hc is excessively high, or a distribution of perpendicular coercivity Hc extends to a wide range of the magnetic field H. This leads to difficulty in saturation recording by the recording head. As a result, it is conceivable that it is difficult to obtain favorable electromagnetic conversion characteristics.

(Magnetic Powder)

The magnetic powders included in the magnetic layer 13 preferably have, for example, mass magnetization σs of 30 emu/g or greater and 60 emu/g or less. In a case where the mass magnetization σs of the magnetic powders is 30 emu/g or greater, an improvement in output as the magnetic recording medium 10 is expectable.

The magnetic powders include, for example, a plurality of magnetic particles having an average particle diameter of 20 nm or less. Specifically, the magnetic powders include, for example, powders of nanoparticles including ε-iron oxide (hereinafter referred to as "ε-iron oxide particles"). Even if the ε-iron oxide particles are fine particles, it is possible to obtain high coercivity. It is preferable that the ε-iron oxide included in the magnetic layer 13 is preferentially crystallographically oriented in the thickness direction (perpendicular direction) of the magnetic recording medium 10.

FIG. 4 is a schematic cross-sectional view of an example of a cross-sectional configuration of an ε-iron oxide particle 20 included in the magnetic layer 13. As illustrated in FIG. 4, the ε-iron oxide particle 20 has a spherical or substantially spherical shape, or a cubic or substantially cubic shape. Since the ε-iron oxide particle 20 has a shape as described above, in a case where the ε-iron oxide particles 20 are used as magnetic particles, it is possible to reduce a contact area per unit volume between the particles in the thickness direction of the magnetic recording medium 10, and thus to suppress aggregation of the particles, as compared with a case of using hexagonal plate-shaped magnetic particles such as hexagonal ferrite as the magnetic particles. Therefore, it is possible to obtain enhanced dispersibility of the magnetic powders and a more favorable SNR.

The ε-iron oxide particle 20 may have a core-shell structure, for example. Specifically, as illustrated in FIG. 4, the ε-iron oxide particle 20 includes a core portion 21 and a shell portion 22 having a two-layer structure provided around the core portion 21. The two-layer structure of the shell portion 22 includes a first shell portion 22a provided on the core portion 21, and a second shell portion 22b provided on the first shell portion 22a. The ε-iron oxide particle 20 desirably include both cobalt (Co) and zirconium (Zr) as additional elements.

The ε-iron oxide particles 20 are formed as follows, for example. First, a silicon compound is added to a solution including a first compound including an iron element and a second compound including the additional elements described above to generate silica xerogel including the iron element and the additional elements described above in silica. Next, generated silica xerogel is subjected to a heat treatment at a temperature of 850° C. to 1300° C. for four to six hours. Thus, the ε-iron oxide particles 20 including ε-iron oxide and the additional elements described above is formed. It is to be noted that the amount of the additional elements described above in the ε-iron oxide particle 20 in the present disclosure refers to an existence ratio (atom %, at %) of the additional elements described above relative to atom % of a combination of Fe and the additional elements taken as 100.

The content of the additional elements described above in the ε-iron oxide particle 20 is measured as follows, for example. First, carbon films are formed on the surface 13S of the magnetic layer 13 of the magnetic recording medium 10 and the surface 14S of the back layer 14 of the magnetic recording medium 10 by a deposition method, and thereafter a tungsten thin film is further formed on the carbon film covering the surface 13S of the magnetic layer 13 by a deposition method. These carbon films and the tungsten film protect the sample during a thinning process to be described later. Next, the magnetic recording medium 10 is processed through a FIB (focused ion beam) method or the like into a thin piece. In a case where the FIB method is used, the formation of the carbon films and the tungsten thin film serving as the protective film is performed as a pretreatment for observing a cross-sectional TEM image to be described later. The carbon films are formed on a magnetic layer-side surface and a back layer-side surface of the magnetic recording medium 10 by a deposition method. The tungsten thin film is then further formed on the magnetic layer-side surface by a deposition method or a sputtering method. The thinning is performed along the length direction (longitudinal direction) of the magnetic recording medium 10. That is, the thinning forms a cross-section parallel to both the longitudinal direction and the thickness direction of the magnetic recording medium 10. The cross-section of the obtained thin sample piece is observed using a scanning electron microscope (SEM) under the following conditions to obtain a SEM image. It is to be noted that magnification and acceleration voltage may be appropriately adjusted depending on the type of the apparatus. After obtaining the SEM image, element analysis of a recording layer is performed under the following conditions.

<Element Analysis (Surface Analysis)>

Analyzing method: energy dispersive X-ray spectroscopy (EDS)

Scanning electron microscope: JEM-ARM200F manufactured by JEOL Ltd.

Acceleration voltage: 200 kV

Beam diameter: about 0.2 nm diameter

Elemental analyzer: JED-2300T

X-ray detector: Si drift detector

Energy resolution: about 140 eV

X-ray take-off angle: 21.9°

Solid angle: 0.98 sr

Capturing pixel number: 256×256

Next, atom % of the additional elements relative to atom % of Fe is calculated from an obtained element analysis result. It is to be noted that points where the content of the additional elements described above in the ε-iron oxide particle 20 is to be measured are randomly selected on the sample piece.

The core portion 21 of the ε-iron oxide particle 20 includes ε-iron oxide. The ε-iron oxide included in the core portion 21 includes preferably ε—Fe$_2$O$_3$ crystals as a main phase, more preferably a single phase of ε—Fe$_2$O$_3$. Incidentally, to achieve high-density recording in the magnetic recording medium 10, it is desirable that the ε-iron oxide included in the core portion 21 be pulverized. However, pulverized ε-iron oxide exhibits high coercivity, but has a tendency that its mass magnetization σs is decreased. A decrease in mass magnetization σs in magnetic powders may result in a decline in output and a decline in thermal stability as the magnetic recording medium 10, and is therefore not preferable. Accordingly, Co (cobalt) is added to the core portion 21. An improvement in mass magnetization σs of the ε-iron oxide particle 20 is expectable by including Co in the ε-iron oxide.

However, adding only Co (cobalt) to the single phase of ε—$Fe_2O_3$ causes distortion in a portion of the M-H loop. In order to eliminate such a phenomenon, in the present disclosure, the core portion 21 further includes Zr (zirconium) together with Co. As a constituent material of the core portion 21, ε—$Fe_2O_3$ including both Co and Zr as additional elements is used to reduce distortion of the M-H loop and hinder production of a sub-peak in an SFD (Switching Field Distribution) curve of the magnetic recording medium 10. It is considered that adding Zr that is a tetravalent element together with a Co that is a bivalent element makes it possible to cause an average valence to be trivalent; therefore, there may be an effect of easily introducing a Co element. Accordingly, it is conceivable that it is possible to more uniformly distribute Co that is the bivalent element to the ε-iron oxide including Fe that is the trivalent element, thereby making it possible to eliminate or reduce distortion of the M-H loop. As a result, it is possible to suppress production of the sub-peak in the SFD curve of the magnetic recording medium 10 and secure a wider region that contributes to magnetic recording in the magnetic layer 13. Thus, the magnetic recording medium 10 is advantageous for high-density recording. It is to be noted that the content of Co in the core portion 21 is preferably 3 atom % or greater and 20 atom % or less relative to atom % of a combination of Fe and Co taken as 100. Furthermore, in this case, the addition amount of Zr in the core portion 21 is preferably 1 atom % or greater and 8 atom % or less relative to atom % of a combination of Fe, Co, and Zr taken as 100. The addition amount of Co and the addition amount of Zr in the core portion 21 are within the ranges described above, which makes it possible to sufficiently reduce distortion of the M-H loop while further enhancing perpendicular coercivity Hc, thereby having the magnetic recording medium 10 that is advantageous for high-density recording.

It is to be noted that the core portion 21 may include a metal element such as Hf (hafnium) as a further additional element.

The first shell portion 22a covers at least a part of periphery of the core portion 21. Specifically, the first shell portion 22a may partially cover the periphery of the core portion 21 or may cover the entire periphery of the core portion 21. From the viewpoint of ensuring sufficient exchange coupling between the core portion 21 and the first shell portion 22a and improving magnetic characteristics, it is preferable to cover the entire surface of the core portion 21.

The first shell portion 22a is a so-called soft magnetic layer, and includes, for example, a soft magnetic material such as α-Fe, Ni—Fe alloy, $CoOFe_2O_3$, or Fe—Si—Al alloy. The α-Fe may be obtained by reducing the ε-iron oxide included in the core portion 21.

The second shell portion 22b is an oxide film serving as an antioxidant layer. The second shell portion 22b includes α-iron oxide, aluminum oxide, or silicon oxide. The α-iron oxide includes, for example, at least one iron oxide of $Fe_3O_4$, $Fe_2O_3$, or FeO. In a case where the first shell portion

22a includes α-Fe (soft magnetic material), the α-iron oxide may be obtained by oxidizing the α-Fe included in the first shell portion 22a.

Since the ε-iron oxide particles 20 has the first shell portion 22a as described above, it is possible to adjust the coercivity Hc of the entire ε-iron oxide particle (core shell particle) 20 to coercivity Hc suitable for recording while maintaining the coercivity Hc of the core portion 21 alone at a large value in order to ensure thermal stability. In addition, since the ε-iron oxide particle 20 has the second shell portion 22b as described above, it is possible to suppress deterioration of the characteristics of the ε-iron oxide particle 20 due to rust or the like generated on the particle surface due to exposure of the ε-iron oxide particles 20 to air during or before the manufacturing process of the magnetic recording medium 10. Therefore, it is possible to suppress the characteristic deterioration of the magnetic recording medium 10 by covering the first shell portion 22a with the second shell portion 22b.

The average particle size (average maximum particle size) of the magnetic powders is preferably 20 nm or less, more preferably 8 nm or greater and 16 nm or less, still more preferably 8 nm or greater and 13 nm or less. In the magnetic recording medium 10, a region having a size of half the recording wavelength corresponds to an actual magnetization region. Therefore, it is possible to obtain a favorable SNR by setting the average particle size of the magnetic powders to half or less of the shortest recording wavelength. Accordingly, in a case where the average particle size of the magnetic powders is 20 nm or less, it is possible to obtain favorable electromagnetic conversion characteristics (e.g., SNR) of the magnetic recording medium 10 having high recording density (e.g., the magnetic recording medium 10 configured to be capable of recording signals at the shortest recording wavelength of 50 nm or less). Meanwhile, in a case where the average particle size of the magnetic powders is 8 nm or greater, it is possible to further improve the dispersibility of the magnetic powders, and thus to obtain more excellent electromagnetic conversion characteristics (e.g., SNR).

The average aspect ratio of the magnetic powders is preferably 1 or greater and 3.0 or less, more preferably 1 or greater and 2.8 or less, still more preferably 1 or greater and 1.8 or less. In a case where the average aspect ratio of the magnetic powders is within a range from 1 to 3.0 both inclusive, it is possible to suppress agglomeration of the magnetic powders and reduce resistance applied to the magnetic powders upon perpendicularly orienting the magnetic powders in the process of forming the magnetic layer 13. Therefore, it is possible to improve the perpendicular orientation of the magnetic powders.

The average particle size and the average aspect ratio of the magnetic powders described above are determined as follows. First, the magnetic recording medium 10 to be measured is processed through the FIB (Focused Ion Beam) method or the like into a thin piece. The thinning is performed along the length direction (longitudinal direction) of the magnetic tape. That is, the thinning forms a cross-section parallel to both the longitudinal direction and the thickness direction of the magnetic recording medium 10. The cross-section of the obtained thin sample piece is observed using a transmission electron microscope (H-9500 manufactured by Hitachi High-Technologies) at an acceleration voltage of 200 kV and total magnification of 500,000 times, in such a manner that the magnetic layer 13 is entirely included in the thickness direction of the magnetic layer 13. A TEM photograph is then captured. Next, 50 particles are randomly selected from the captured TEM photograph, and the major axis length DL and the minor axis length DS of each particle are measured. Here, the major axis length DL refers to the maximum distance between any two parallel lines drawn from any angles so as to contact the contour of each particle (so-called maximum Feret diameter). Meanwhile, the minor axis length DS refers to the maximum length of the particle in the direction perpendicular to the major axis length DL of the particle.

Subsequently, the major axis lengths DL of the 50 measured particles are simply averaged (arithmetically averaged) to determine an average major axis length DLave. The average major axis length DLave determined in this manner is defined as the average particle size of the magnetic powders. In addition, the minor axis lengths DS of the 50 measured particles are simply averaged (arithmetically averaged) to determine an average minor axis length DSave. Thereafter, an average aspect ratio (DLave/DSave) is determined from the average major axis length DLave and the average minor axis length DSave.

The average particle volume of the magnetic powders is preferably 5500 nm$^3$ or less, more preferably 270 nm$^3$ or greater and 5500 nm$^3$ or less, still more preferably 900 nm$^3$ or greater and 5500 nm$^3$ or less. In a case where the average particle volume of the magnetic powders is 5500 nm$^3$ or less, it is possible to achieve effects similar to those in a case where the average particle size is 22 nm or less. Meanwhile, in a case where the average particle volume of the magnetic powders is 270 nm$^3$ or greater, it is possible to achieve effects similar to those in a case where the average particle size of the magnetic powders is 8 nm or greater.

In a case where the ε-iron oxide particle 20 has a spherical or substantially spherical shape, the average particle volume of the magnetic powders is determined as follows. First, the average major axis length DLave is determined in a manner similar to the above-described calculation methods of the average particle sizes of the magnetic powders. Next, an average volume V of the magnetic powders is determined using the following expression.

$$V = (\pi/6) \times (DL\text{ave})^3$$

(Binder)

It is preferable to use, as the binder, a resin having a structure in which a crosslinking reaction is imparted to a polyurethane-based resin, a vinyl chloride-based resin, or the like. However, the binder is not limited thereto, and other resins may be appropriately blended depending on desired physical properties and the like of the magnetic recording medium 10. The resin to be blended is not particularly limited as long as being a resin commonly used in the magnetic recording medium 10 of a coating type.

Examples of the binder include polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivatives (cellulose acetate butyrate, cellulose diacetate, cellulose triacetate, cellulose propionate, and nitrocellulose), styrene butadiene copolymer, polyester resin, amino resin, synthetic rubber, and the like.

In addition, examples of a thermosetting resin or a reactive resin include phenolic resin, epoxy resin, urea resin, melamine resin, alkyd resin, silicone resin, polyamine resin, urea formaldehyde resin, and the like.

In addition, a polar functional group, such as —SO$_3$M, —OSO$_3$M, —COOM, P=O(OM)$_2$ or the like may be introduced into each of the binders described above for the purpose of improving the dispersibility of the magnetic powders. Here, M in the above chemical formulae is a hydrogen atom or an alkali metal, such as lithium, potassium, or sodium.

Further, examples of the polar functional group include those of the side chain type having a terminal group of —NR1R2 or —NR1R2R3$^+$X$^-$, and those of the main chain type of >NR1R2$^+$X$^-$. Here, R1, R2, and R3 in the above formulae are hydrogen atoms or hydrocarbon groups, and X$^-$ is a halogen element ion, such as fluorine, chlorine, bromine, or iodine, or an inorganic or organic ion. Further, another examples of the polar functional group include —OH, —SH, —CN, epoxy groups, and the like.

(Lubricant)

The lubricant included in the magnetic layer 13 includes, for example, fatty acid and fatty acid ester. It is preferable that the fatty acid included in the lubricant include at least one of a compound represented by the following general formula <1> or a compound represented by the following general formula <2>, for example. Further, it is preferable that the fatty acid ester included in the lubricant include at least one of a compound represented by the following general formula <3> or a compound represented by the following general formula <4>. It is possible to suppress an increase in dynamic friction coefficient due to repetitive recording or reproducing on the magnetic recording medium 10 by the lubricant including two compounds including the compound represented by the general formula <1> and the compound represented by the general formula <3>; the lubricant including two compounds including the compound represented by the general formula <2> and the compound represented by the general formula <3>; the lubricant including two compounds including a compound represented by the general formula <1> and the compound represented by the general formula <4>; the lubricant including two compounds including a compound represented by the general formula <2> and a compound represented by the general formula <4>; the lubricant including three compounds including the compound represented by the general formula <1>, the compound represented by the general formula <2>, and the compound represented by the general formula <3>; the lubricant including three compounds including the compound represented by general formula <1>, the compound represented by general formula <2>, and the compound represented by the general formula <4>; the lubricant including three compounds including the compound represented by the general formula <1>, the compound represented by the general formula <3>, and the compound represented by the general formula <4>; the lubricant including three compounds including the compound represented by the general formula <2>, the compound represented by the general formula <3>, and the compound represented by the general formula <4>; or the lubricant including four compounds including the compound represented by the general formula <1>, the compound represented by the general formula <2>, the compound represented by the general formula <3>, and the compound represented by the general formula <4>. As a result, it is possible to improve the traveling performance of the magnetic recording medium 10.

$$CH_3(CH_2)kCOOH \qquad \text{<1>}$$

(Note that, in the general formula <1>, k is an integer selected from a range of 14 to 22 both inclusive, more preferably a range of 14 to 18 both inclusive.)

$$CH_3(CH_2)_nCH=CH(CH_2)mCOOH \qquad \text{<2>}$$

(Note that, in the general formula <2>, the sum of n and m is an integer selected from a range of 12 to 20 both inclusive, more preferably a range of 14 to 18 both inclusive.)

$$CH_3(CH_2)_pCOO(CH_2)_qCH_3 \qquad \text{<3>}$$

(Note that, in the general formula <3>, p is an integer selected from a range of 14 to 22 both inclusive, more preferably a range of 14 to 18 both inclusive, and q is an integer selected from a range of 2 to 5 both inclusive, more preferably a range of 2 to 4 both inclusive.)

$$CH_3(CH_2)_pCOO—(CH_2)_qCH(CH_3)_2 \qquad \text{<4>}$$

(Note that, in the general formula <4>, p is an integer selected from a range of 14 to 22 both inclusive, q is an integer selected from a range of 1 to 3 both inclusive.)
(Additive)

The magnetic layer 13 may further include aluminum oxide (α, β, or γ alumina), chromium oxide, silicon oxide, diamond, garnet, emery, boron nitride, titanium carbide, silicon carbide, titanium carbide, titanium oxide (rutile or anatase-type titanium oxide), or the like as non-magnetic reinforcing particles.
(Underlayer 12)

The underlayer 12 is a non-magnetic magnetic layer including non-magnetic powders and a binder. The under-layer 12 may further include at least one additive of, for example, a lubricant, conductive particles, a curing agent, or a rust inhibitor, as needed basis. Further, the underlayer 12 may have a multilayer structure in which a plurality of layers are stacked. An average thickness of the underlayer 12 is preferably 0.5 μm or greater and 0.9 μm or less, more preferably 0.6 μm or greater and 0.7 μm or less. The average thickness of the underlayer 12 is as thin as 0.9 μm or less, which effectively decreases the Young's modulus of the entire magnetic recording medium 10, as compared with a case where the thickness of the base 11 is reduced. This facilitates tension control over the magnetic recording medium 10. In addition, the average thickness of the underlayer 12 is 0.5 μm or greater, thereby securing adhesion strength between the base 11 and the underlayer 12. Fur-thermore, it is possible to suppress variations in the thick-ness of the underlayer 12 and prevent an increase in rough-ness of the surface 13S of the magnetic layer 13.

It is to be noted that the average thickness of the under-layer 12 is determined, for example, as follows. First, the magnetic recording medium 10 having a width of ½ inches is prepared, and cut into a length of 250 mm to produce a sample. Thereafter, the underlayer 12 and the magnetic layer 13 are removed from the base 11 of the sample of the magnetic recording medium 10. Thereafter, the measuring apparatus, Laser Hologage (LGH-110C) manufactured by Mitsutoyo Corporation, is used to measure the thickness of a laminate of the underlayer 12 and the magnetic layer 13 removed from the base 11 at five points or more. Thereafter, these measurement values are simply averaged (arithmeti-cally averaged) to calculate an average thickness of the laminate of the underlayer 12 and the magnetic layer 13. It is to be noted that the measurement points are randomly selected on the sample. Finally, the average thickness of the underlayer 12 is determined by subtracting the average thickness of the magnetic layer 13 measured using the TEM as described above from the average thickness of the lami-nate.

The underlayer 12 may have pores, that is, the underlayer 12 may be provided with multiple pores. The pores of the underlayer 12 are preferably formed with, for example, formation of pores (depressions) in the magnetic layer 13. In particular, the pores may be formed by pressing, against a magnetic layer-side surface, multiple protrusions provided on the surface 14S of the back layer 14 of the magnetic recording medium 10. That is, the pores may be formed in each of the magnetic layer 13 and the underlayer 12 by forming depressions corresponding to the shapes of protru-sions, on the surface 13S of the magnetic layer 13. Alter-natively, the pores may be formed by volatilization of a solvent in a process of drying a coating material for forming a magnetic layer. In addition, upon coating the surface of the underlayer 12 with the coating material for forming a magnetic layer to form the magnetic layer 13, a solvent in the coating material for forming a magnetic layer may pass through the pores of the underlayer 12 formed upon coating and drying an underlayer to penetrate into the underlayer 12. Thereafter, upon volatilizing the solvent having penetrated into the underlayer 12 in a process of drying the magnetic layer 13, the solvent having penetrated into the underlayer 12 may move from the underlayer 12 to the surface 13S of the magnetic layer 13 to form pores. The thus-formed pores may be communicated with the magnetic layer 13 and the underlayer 12, for example. It is possible to adjust the average diameter of the pores by changing the type of a solid content or a solvent in the coating material for forming a magnetic layer or drying conditions for the coating material for forming a magnetic layer. The pores are formed in both the magnetic layer 13 and the underlayer 12, which causes a specifically suitable quantity of the lubricant for favorable traveling stability to come to the magnetic layer-side sur-face. This makes it possible to further suppress an increase in the dynamic friction coefficient due to repetitive recording or reproducing.

From the viewpoint of suppressing a decrease in the dynamic frictional coefficient after repetitive recording or reproduction, it is preferable that the pores of the underlayer 12 be connected to the depressions of the magnetic layer 13. Here, the state in which the pores of the underlayer 12 are connected to the depressions of the magnetic layer 13 includes a state in which some of the multiple pores of the underlayer 12 are connected to some of multiple depressions of the magnetic layer 13.

From the viewpoint of facilitating the supply of the lubricant to the surface 13S of the magnetic layer 13, it is preferable that the multiple depressions include those extending perpendicularly to the surface 13S of the magnetic layer 13. In addition, from the viewpoint of facilitating the supply of the lubricant to the surface 13S of the magnetic layer 13, it is preferable that the pores of the underlayer 12 extending perpendicularly to the surface 13S of the magnetic layer 13 are connected to the depressions of the magnetic layer 13 extending perpendicularly to the surface 13S of the magnetic layer 13.
(Non-Magnetic Powder of Underlayer 12)

The non-magnetic powders include, for example, at least one of inorganic particle powders or organic particle pow-ders. Further, the non-magnetic powders may include carbon powders, such as carbon black. It is to be noted that one kind of non-magnetic powders may be used alone, or two or more kinds of non-magnetic powders may be used in combination. Examples of the inorganic particles include metals, metal oxides, metal carbonates, metal sulfates, metal nitrides, metal carbides or metal sulfides, or the like. The non-magnetic powders have various shapes including, but not limited thereto, needle-like, spherical, cubic, or plate-like shapes.

(Binder for Underlayer 12)

The binder for the underlayer 12 is similar to that in the magnetic layer 13 described above.

(Back Layer 14)

The back layer 14 includes, for example, a binder and non-magnetic powders. The back layer 14 may further include at least one additive of a lubricant, a curing agent, an antistatic agent, or the like, as needed basis. The binder and the non-magnetic powders in the back layer 14 are similar to the binder and the non-magnetic powders in the underlayer 12 described above.

The average particle size of the non-magnetic powders in the back layer 14 is preferably 10 nm or greater and 150 nm or less, more preferably 15 nm or greater and 110 nm or less. The average particle size of the non-magnetic powders in the back layer 14 is determined in the same manner as for the average particle size of the magnetic powders in the magnetic layer 13 described above. The non-magnetic powders may include one having a particle size distribution of 2 or greater.

The upper limit value of the average thickness of the back layer 14 is preferably 0.6 μm or less, particularly preferably 0.5 μm or less. In a case where the upper limit value of the average thickness of the back layer 14 is 0.6 μm or less, it is possible to keep the thicknesses of the underlayer 12 and the base 11 thick even if the average thickness of the magnetic recording medium 10 is 5.6 μm or less, and thus to maintain traveling stability of the magnetic recording medium 10 in the recording and reproducing apparatus. The lower limit value of the average thickness of the back layer 14 is, for example but not particularly limited to, 0.2 μm or greater, particularly preferably 0.3 μm or greater.

The average thickness of the back layer 14 is determined as follows. First, the magnetic recording medium 10 having a width of ½ inches is prepared, and cut into a length of 250 mm to produce a sample. Thereafter, the measuring apparatus, Laser Hologage (LGH-110C) manufactured by Mitsutoyo Corporation, is used to measure the thickness of the sample of the magnetic recording medium 10 at five points or more. Thereafter, these measurement values are simply averaged (arithmetically averaged) to calculate an average thickness $t_T$ [μm] of the magnetic recording medium 10. It is to be noted that the measurement points are randomly selected on the sample. Subsequently, the back layer 14 is removed from the sample of the magnetic recording medium 10 with a solvent, such as MEK (methyl ethyl ketone) or dilute hydrochloric acid. Thereafter, the Laser Hologage described above is used again to measure the thickness of the sample of the magnetic recording medium 10 from which the back layer 14 has been removed, at five points or more. These measurement values are simply averaged (arithmetically averaged) to calculate an average thickness $t_B$ [μm] of the magnetic recording medium 10 from which the back layer 14 has been removed. It is to be noted that the measurement points are randomly selected on the sample. Finally, an average thickness $t_b$[μm] of the back layer 14 is determined by the following expression.

$$t_b[\mu m]=t_T[\mu m]-t_B[\mu m]$$

(Average Thickness of Magnetic Recording Medium 10)

The upper limit value of the average thickness (average total thickness) of the magnetic recording medium 10 is preferably 5.6 μm or less, more preferably 5.0 μm or less, particularly preferably 4.6 μm or less, still more preferably 4.4 μm or less. In a case where the average thickness of the magnetic recording medium 10 is 5.6 μm or less, it is possible to increase storage capacity per data cartridge, as compared with a general magnetic recording medium. The lower limit value of the average thickness of the magnetic recording medium 10 is, for example but not particularly limited to, 3.5 μm or greater.

The average thickness tT of the magnetic recording medium 10 is determined as follows. First, the magnetic recording medium 10 having a width of ½ inches is prepared, and cut into a length of 250 mm to produce a sample. Thereafter, the measuring apparatus, Laser Hologage (LGH-110C) manufactured by Mitsutoyo Corporation, is used to measure the thickness of the sample at five points or more. Thereafter, these measurement values are simply averaged (arithmetically averaged) to calculate an average thickness tT [μm]. It is to be noted that the measurement points are randomly selected on the sample.

(Ratio Hrp/Hc)

Furthermore, a ratio Hrp/Hc of residual coercivity Hrp (see FIG. 3A) measured in a direction perpendicular to a film surface of the magnetic recording medium 10 with use of a pulse magnetic field to perpendicular coercivity Hc (see FIG. 3A) in the direction perpendicular to the film surface of the magnetic recording medium 10 is preferably 2.0 or less. Keeping the ratio Hrp/Hc within a predetermined range makes it possible to improve a signal attenuation amount. That is, the magnetic recording medium 10 that has a small difference between the residual coercivity Hrp and the perpendicular coercivity Hc and the ratio Hrp/Hc having a value close to 1 has high thermal stability. Meanwhile, the magnetic recording medium 10 that has a large difference between the residual coercivity Hrp and the perpendicular coercivity Hc and the ratio Hrp/Hc having a value heavily greater than 1 (e.g., a value exceeding 2) has low thermal stability. Causing the ratio Hrp/Hc to have a value of 2.0 or less makes it possible to avoid a decrease in thermal stability and also to secure ease of writing of magnetization signals. Avoiding a decrease in thermal stability makes it possible to suppress an unstable state in which the magnetic recording medium 10 is easily affected by an influence of an ambient temperature, and thus to improve data preservability (long-term reliability of the magnetic recording medium 10). It is to be noted that in order to have a ratio Hrp/Hc of 2.0 or less, the magnetic layer 13 is preferably formed with use of magnetic powders having mass magnetization σs of 30 emu/g or greater and 60 emu/g or less, for example. The ε-iron oxide of the present disclosure has high mass magnetization σs as described above, and has high perpendicular coercivity Hc that is an intrinsic property of the ε-iron oxide, which makes it possible for ε-iron oxide to have high thermal stability even in a fine particle form. Meanwhile, the ε-iron oxide has high mass magnetization σs, which makes it possible to secure high Mst (saturation magnetization per unit area) and maintain high recording and reproducing output. That is, as described above, it is possible to achieve both high thermal stability, that is, long-term reliability, and high electromagnetic conversion characteristics. It is to be noted that the perpendicular coercivity Hc is desirably 2000 Oe or greater and 6000 Oe or less, more desirably 2500 Oe or greater and 4500 Oe or less.

In measurement of the perpendicular coercivity Hc, measurement is performed while sweeping a magnetic field at low speed; therefore, even during the measurement, the mass magnetization σ of the magnetic layer 13 is varied by an influence of ambient heat. Meanwhile, in measurement of the residual coercivity Hrp, measurement is performed instantaneously by applying a pulsed magnetic field. Accordingly, it is conceivable that the influence of the ambient heat is reduced and the residual coercivity Hrp is increased. It is conceivable that in a magnetic recording medium having high thermal stability, a decrease in the perpendicular coercivity Hc due to heat is small, thereby decreasing the ratio Hrp/Hc. In contrast, in a case of a magnetic recording medium having low thermal stability, it is conceivable that a converse phenomenon occurs to make a decrease in the perpendicular coercivity Hc due to heat larger, and to increase the ratio Hrp/Hc.

The perpendicular coercivity Hc is determined as follows. First, three sheets of the magnetic recording media 10 are superimposed with double-sided tapes interposed therebetween, and then punched out by a 6.39 mm-diameter punch to prepare a measurement sample. At this time, marking is performed with any ink having no magnetism so that the longitudinal direction (traveling direction) of the magnetic recording medium 10 is made recognizable. Thereafter, a VSM is used to measure a M-H loop of the measurement sample (the entire magnetic recording medium 10) corresponding to the perpendicular direction (thickness direction) of the magnetic recording medium 10.

Next, acetone, ethanol, or the like is used to wipe off coating films, that is, the underlayer 12, the magnetic layer 13, the back layer 14, and the like to leave only the base 11. Then, three sheets of the obtained bases 11 are superimposed with double-sided tapes interposed therebetween, and then punched out by a 6.39 mm-diameter punch to produce a background-correction sample (hereinafter, simply referred to as correction sample). Thereafter, the VSM is used to measure a M-H loop of the correction sample (the base 11) corresponding to the perpendicular direction of the base 11 (the perpendicular direction of the magnetic recording medium 10).

For example, the high sensitivity vibrating sample magnetometer "VSM-P7-15" manufactured by Toei Industry Co., Ltd. is used to measure the M-H loop of the measurement sample (the entire magnetic recording medium 10) and the M-H loop of the correction sample (the base 11). Measurement conditions are as follows: measurement mode: full loop, maximum magnetic field: 15 kOe, magnetic field step: 40 bits, time constant of locking amp: 0.3 sec, waiting time: 1 sec, and MH averaging number: 20.

After the two M-H loops are obtained, the M-H loop of the correction sample (the base 11) is subtracted from the M-H loop of the measurement sample (the entire magnetic recording medium 10) to perform background correction, and an M-H loop after the background correction is thereby obtained. Measurement and analysis programs attached to the "VSMP7-15" are used for calculation in the background correction.

The perpendicular coercivity Hc is determined from the obtained M-H loop after the background correction. It is to be noted that the M-H loops described above are both measured at 25° C. In addition, "demagnetizing field correction" is not performed in a case where the M-H loop is measured in the perpendicular direction of the magnetic recording medium 10. It is to be noted that the measurement and analysis programs attached to the "VSM-P7-15" are used for this calculation.

The residual coercivity Hrp is determined as follows. A high-speed response characteristic evaluation apparatus HR-PVSM20 manufactured by HAYAMA Inc. is used to measure a residual magnetization curve in a direction perpendicular to a film surface for a measurement sample that is similar to a sample used for calculation of the perpendicular coercivity Hc described above.

First, a magnetic field of −3980 kA/m (about −15 kOe) in the perpendicular direction is applied to the entire sample, and the magnetic field is returned to zero to be a residual magnetization state. Thereafter, a magnetic field of about 40.2 kA/m (about 505 Oe) is applied in the opposite direction, and the magnetic field is returned to zero again to measure a residual magnetic amount. The applied magnetic field at this time is a pulse magnetic field having a pulse width of $10^{-8}$ sec. Thereafter, similarly, the measurement in which a magnetic field greater than the previously applied magnetic field by about 40.2 kA/m is applied and returned to zero is repeatedly performed, and the residual magnetization amount is plotted with respect to the applied magnetic field to measure a DCD curve. A measuring magnetic field is up to about 20 kOe. It is to be noted that background correction and demagnetizing field correction are not particularly performed. It is to be noted that magnitude of the magnetic field to be applied to the sample is changed by changing a voltage to be applied. The step voltage is 17.5 V (equivalent to about 505 Oe of a magnetic field).

Main measurement conditions are as follows.

Initial magnetization voltage: 220 V (equivalent to −3980 kA/m)

Measurement start voltage: 0 V (equivalent to 0 Oe)

Step voltage: 17.5 V (equivalent to about 505 Oe)

Maximum voltage: 350 V (equivalent to 20 kOe)

Waiting time of lock-in amplifier: 10 sec

Phase correction is performed from data stored after measurement to obtain a residual magnetization curve (FIG. 5). A straight line connects two points (a point P1 and a point P2) between which an X axis is sandwiched in FIG. 5, and a point where the straight line intersects with the X axis is calculated as the residual coercivity Hrp.

The unit of the magnetization amount is originally emu; however, in the high-speed response characteristic evaluation apparatus described above, the magnetization amount at each applied magnetic field is outputted as a voltage V, and either a positive value or a negative value of the magnetization amount (voltage V) at each applied magnetic field is outputted as a positive value. Accordingly, correction corresponding to a phase at each applied magnetic field is necessary. For this correction, phase information data included in an output result by the high-speed response characteristic evaluation apparatus is used. The phase information data at each applied magnetic field is outputted together with the magnetization amount (voltage V) at each applied magnetic field. In a case where phase information data about the magnetic amount (voltage V) measured at a certain magnetic field is a negative value, it is necessary to multiply the measured magnetization amount (voltage V) by "−1", and a value obtained by multiplying the measured magnetization amount (voltage V) by "−1" is used to obtain a residual magnetization curve. A process of multiplying by "−1" is the phase correction described above.

In contrast, in a case where phase information data about the magnetization amount (voltage V) measured at a certain magnetic field is a positive value, it is not necessary to multiply the measured magnetization amount (voltage V) by "−1", and the measured magnetization amount (voltage V) is used as it is to obtain a residual magnetization curve. The magnetization amount after phase correction (an amount obtained by multiplying by "−1") and the magnetization amount (an amount not multiplied by "−1") that are obtained as described above are plotted with respect to the magnetic field to obtain a residual magnetization curve as illustrated in the drawing.

[2-2 Method of Manufacturing Magnetic Recording Medium 10]

Next, a method of manufacturing the magnetic recording medium 10 having the above-described configuration will be described. First, a coating material for forming an underlayer is prepared by kneading and dispersing non-magnetic powders, a binder, a lubricant, and the like in a solvent. Next, a coating material for forming a magnetic layer is prepared by kneading and dispersing magnetic powders, a binder, a lubricant, and the like in a solvent. Next, a coating material for forming a back layer is prepared by kneading and dispersing a binder, non-magnetic powders, and the like in a solvent. To prepare the coating material for forming a magnetic layer, the coating material for forming an underlayer, and the coating material for forming a back layer, the following solvents, a dispersion apparatus, and a kneading apparatus may be used, for example.

Examples of the solvent used for preparing the above-mentioned coating materials include: a ketone-based solvent, such as acetone, methyl ethyl ketone, methyl isobutyl ketone, or cyclohexanone; an alcohol-based solvent, such as methanol, ethanol, or propanol; an ester-based solvent, such as methyl acetate, ethyl acetate, butyl acetate, propyl acetate, ethyl lactate, or ethylene glycol acetate; an ether-based solvent, such as diethylene glycol dimethyl ether, 2-ethoxyethanol, tetrahydrofuran, or dioxane; an aromatic hydrocarbon solvent, such as benzene, toluene, or xylene; and a halogenated hydrocarbon solvent, such as methylene chloride, ethylene chloride, carbon tetrachloride, chloroform, or chlorobenzene. These may be used alone, and may be used in combination as appropriate.

Examples of the kneading apparatus used for the preparation of the coating materials described above may include, for example but not particularly limited to, a continuous twin-screw kneader, a continuous twin-screw kneader allowing for dilution in multiple stages, a kneader, a pressure kneader, a roll kneader, and other kneading apparatuses. Additionally, examples of the dispersing apparatus used for the preparation of the coating materials described above may include, for example but not particularly limited to, a roll mill, a ball mill, a transverse sand mill, a longitudinal sand mill, a spike mill, a pin mil, a tower mil, a pearl mill (e.g., a "DCP mill" manufactured by Eirich Co., Ltd., etc.), a homogenizer, an ultrasonic disperser, and other dispersing apparatuses.

Next, the coating material for forming an underlayer is applied to one main surface 11A of the base 11 and dried to form the underlayer 12. Subsequently, the coating material for forming a magnetic layer is applied onto the underlayer 12 and dried to form the magnetic layer 13 on the underlayer 12. It is to be noted that, during the drying, it is preferable to cause the magnetic field of the magnetic powders to be oriented in the thickness direction of the base 11 by a solenoidal coil, for example. Alternatively, during the drying, the magnetic field of the magnetic powders may be oriented in the traveling direction (longitudinal direction) of the base 11, and thereafter oriented in the thickness direction of the base 11 by a solenoidal coil, for example. Such a magnetic field orientation process makes it possible to improve the degree of perpendicular orientation (i.e., the squareness ratio 51) of the magnetic powders. After the magnetic layer 13 is formed, the coating material for forming a back layer is applied to another main surface 11B of the base 11 and dried to form the back layer 14. The magnetic recording medium 10 is thereby obtained.

Thereafter, the obtained magnetic recording medium 10 is subjected to a calendering process to smooth the surface 13S of the magnetic layer 13. Next, the magnetic recording medium 10 after the calendering process is rolled up, and then subjected to a heat treatment while the magnetic recording medium 10 is in this state, to transfer a plurality of protrusions of the surface 14S of the back layer 14 onto the surface 13S of the magnetic layer 13. As a result, multiple depressions are formed in the surface 13S of the magnetic layer 13.

The temperature of the heat treatment is preferably 50° C. or higher and 80° C. or lower. In a case where the temperature of the heat treatment is 50° C. or higher, it is possible to obtain favorable transfer properties. In contrast, in a case where the temperature of the heat treatment is 80° C. or lower, the number of the pores becomes too large, which may cause too much lubricant to be applied on the surface 13S of the magnetic layer 13. Here, the temperature of the heat treatment is the temperature of an atmosphere in which the magnetic recording medium 10 is held.

The time of the heat treatment is preferably 15 hours or longer and 40 hours or shorter. In a case where the time of the heat treatment is 15 hours or longer, it is possible to obtain favorable transfer properties. Meanwhile, in a case where the time of the heat treatment is 40 hours or shorter, it is possible to suppress a decrease in productivity.

Further, the pressure applied to the magnetic recording medium 10 during the heat treatment is preferably in a range from 150 kg/cm to 400 kg/cm both inclusive.

Finally, the magnetic recording medium 10 is cut into a predetermined width (e.g., ½ inch wide). The magnetic recording medium 10 is thereby obtained as desired.

[2-3 Effects]

As described above, the magnetic recording medium 10 according to the present embodiment is a tape-like member in which the base 11, the underlayer 12, and the magnetic layer 13 are stacked in order. The magnetic recording medium 10 satisfies each of the configuration requirements <1> to <3> described below. <1> The magnetic layer 13 includes magnetic powders including ε-iron oxide. <2> The ratio (Hrp/Hc) of residual coercivity (Hrp) measured in the perpendicular direction of the magnetic recording medium 10 with use of a pulse magnetic field to the perpendicular coercivity (Hc) in a direction perpendicular to the film surface is 2.0 or less. <3> A magnetic layer having saturation magnetization (Mst) per unit area of 4.5 mA or greater is included.

With the magnetic recording medium 10 according to the present embodiment having such a configuration, it is possible to achieve excellent electromagnetic conversion characteristics and high long-term reliability even in a case where recording density is increased. For example, the magnetic layer 13 includes magnetic powders including ε-iron oxide doped with Co and Zr; therefore, the magnetic recording medium 10 satisfies the configuration requirements described above. The magnetic powders including the ε-iron oxide doped with Co and Zr have high perpendicular coercivity Hc and mass magnetization σs. Thus, the magnetic recording medium 10 using such magnetic powders makes it possible to achieve both excellent electromagnetic conversion characteristics and high long-term reliability.

3. Modification Examples

Modification Example 1

In the embodiment described above, the ε-iron oxide particle 20 including the shell portion 22 of a two-layer structure (FIG. 4) has been exemplified and described. However, the magnetic recording medium of the present technology may include an ε-iron oxide particle 20A including a shell portion 23 of a single layer structure, as illustrated in FIG. 6, for example. The shell portion 23 of the ε-iron oxide particle 20A has, for example, a configuration similar to that of the first shell portion 22a. However, from the viewpoint of suppressing the characteristic deterioration, the ε-iron oxide particle 20 having the shell portion 22 of the two-layer structure described in the embodiment described above is more preferable than the ε-iron oxide particle 20A of Modification Example 1.

Modification Example 2

As illustrated in FIG. 7, for example, the magnetic recording medium 10 may further include a barrier layer 15 provided on at least one surface of the base 11. The barrier layer 15 is a layer for suppressing a dimensional change of the base 11 depending on an environment. For example, one example cause of the dimensional change is a hygroscopic property of the base 11. It is possible to reduce the rate of water penetration into the base 11 by the deposition of the barrier layer 15. The barrier layer 15 includes, for example, a metal or a metal oxide. As the metal here, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta may be used. As the metal oxide, for example, a metal oxide including one or more of the metals described above may be used. More specifically, for example, at least one of $Al_2O_3$, CuO, CoO, $SiO_2$, $Cr_2O_3$, $TiO_2$, $Ta_2O_5$, or $ZrO_2$ may be used. In addition, the barrier layer 15 may include diamond-like carbon (DLC) or diamond.

The average thickness of the barrier layer 15 is preferably 20 nm or greater and 1000 nm or less, more preferably 50 nm or greater and 1000 nm or less. The average thickness of the barrier layer 15 is determined in the same manner as for the average thickness of the magnetic layer 13. Note that the magnification of the TEM image is appropriately adjusted depending on the thickness of the barrier layer 15.

EXAMPLES

Hereinafter, the present disclosure is described in specific with reference to examples. However, the present disclosure is not limited to these examples.

In the following examples and comparative examples, the saturation magnetization Mst per unit area of the magnetic layer 13, the M-H loop, the perpendicular coercivity Hc, the mass magnetization σs of the magnetic layer 13, the average thickness of the magnetic layer 13, the average particle size of the magnetic powders, the residual coercivity Hrp, and positions of a first peak and a second peak in a diffraction pattern measured by in-plane X-ray diffraction (with a Cu tube) in the magnetic layer 13 are values determined by the measurement methods described in the above embodiment.

Example 1

A magnetic recording medium of Example 1 was obtained as follows.

<Preparation Process of Coating Material for Forming Magnetic Layer>

The coating material for forming a magnetic layer was prepared as follows. First, a first composition of the following formulation was kneaded by an extruder. Next, the kneaded first composition and a second composition of the following formulation were added to a stirring tank equipped with a disper to perform preliminary mixing. Subsequently, sand mill mixing was further performed, and a filter treatment was performed to prepare the coating material for forming a magnetic layer.

(First Composition)

The constituents and weight of the first composition are as follows.

ε-iron oxide particle powders (Co [at %]/Fe [at %]=0.14, Zr [at %]/Fe [at %]=0.05, spherical, average aspect ratio: 1.1, average particle size: 16 nm, particle volume: 2150 $nm^3$, mass magnetization σs: 39 emu/g): 100 parts by mass Vinyl chloride-based resin: 40 parts by mass (a solvent is included)

(resin solution: resin: 30% by mass, cyclohexanone: 70% by mass)

(Polymerization degree: 300, Mn=10000 and 0.07 mmol/g of $OSO_3K$ and 0.03 mmol/g of secondary OH as a polar group are included)

Aluminum oxide powders: 5 parts by mass (α-$Al_2O_3$, average particle size: 0.1 μm)

Carbon black (manufactured by Tokai Carbon Co., Ltd., trade name: SEAST TA): 2 parts by mass (Second Composition)

The constituents and weight of the second composition are as follows.

Vinyl chloride-based resin: 3 parts by mass (a solution is included)

(Resin solution: resin: 30% by mass, cyclohexanone: 70% by mass)

N-butylstearate as fatty acid ester: 2 parts by mass

Methyl ethyl ketone: 121.3 parts by mass

Toluene: 121.3 parts by mass

Cyclohexanone: 60.7 parts by mass

To the coating material for forming a magnetic layer prepared as described above, 4 parts by mass of polyisocyanate (trade name: Coronate L, manufactured by Tosoh Corporation) as a curing agent, and 2 parts by mass of stearic acid as a fatty acid were added.

<Preparation Process of Coating Material for Forming Underlayer>

The coating material for forming an underlayer was prepared as follows. First, a third composition of the following formulation was kneaded by an extruder. Next, the kneaded third composition and a fourth composition of the following formulation were added to a stirring tank equipped with a disper to perform preliminary mixing. Subsequently, sand mill mixing was further performed, and a filter treatment was performed to prepare the coating material for forming an underlayer.

(Third Composition)

The constituents and weight of the third composition are as follows.

Needle-shaped iron oxide powders (α-$Fe_2O_3$, average major axis length: 0.15 μm): 100 parts by mass Vinyl chloride-based resin (resin solution: resin: 30% by mass, cyclohexanone: 70% by mass): 60.6 parts by mass Carbon black (average particle size: 20 nm): 10 parts by mass (Fourth Composition)

The constituents and weight of the fourth composition are as follows.

Polyurethane-based resin UR8200 (manufactured by Toyo Boseki: 18.5 parts by mass)

N-butylstearate as fatty acid ester: 2 parts by mass

Methyl ethyl ketone: 108.2 parts by mass

Toluene: 108.2 parts by mass

Cyclohexanone: 18.5 parts by mass

To the coating material for forming an underlayer prepared as described above, 4 parts by mass of polyisocyanate (trade name: Coronate L, manufactured by Tosoh Corporation) as a curing agent, and 2 parts by mass of stearic acid as a fatty acid were added.

<Preparation Process of Coating Material for Forming Back Layer>

The coating material for forming a back layer was prepared as follows. The coating material for forming a back layer was prepared by mixing raw materials described below in a stirring tank equipped with a disper and performing a filter process.

Small particle-diameter carbon black powders (average particle diameter (D50) 20 nm): 90 parts by mass Large particle-diameter carbon black powders (average particle diameter (D50) 270 nm): 10 parts by mass Polyester polyurethane (manufactured by Tosoh Corporation, trade name: N-2304): 100 parts by mass Methyl ethyl ketone: 500 parts by mass Toluene: 400 parts by mass Cyclohexanone: 100 parts by mass <Application Process>

Using the coating material for forming a magnetic layer and the coating material for forming an underlayer prepared as described above, an underlayer, and a magnetic layer were formed on one main surface of an elongated polyester film having an average thickness of 4.0 µm and serving as a non-magnetic supporting member, as follows so as to respectively have an average thickness of 0.6 µm and an average thickness of 80 nm after calendering. First, an underlayer was formed by applying the coating material for forming an underlayer on the one main surface of the polyester film and drying the coating material. Next, a magnetic layer was formed by applying the coating material for forming a magnetic layer on the underlayer and drying the coating material. It is to be noted that, during the drying of the coating material for forming a magnetic layer, the magnetic field of the magnetic powders were oriented in the thickness direction of the film by a solenoid coil. Additionally, the drying conditions (drying temperatures and drying times) for the coating material for forming a magnetic layer were adjusted, and the coercivity Hc in the thickness direction (perpendicular direction) of the magnetic recording medium was set to the values shown in Table 1 below. Subsequently, a back layer having an average thickness of 0.3 µm was formed by applying the coating material for forming a back layer on another main surface of the polyester film and drying the coating material.

<Calendering and Transferring Processes>

Subsequently, a calendering process was performed to smooth the surfaces of the magnetic layer. Next, the magnetic recording medium having the magnetic layer with the smoothed surface was rolled up, and then a heat treatment was performed on the magnetic recording medium in the rolled-up state at 60° C. for 10 hours. Then, the magnetic recording medium was rewound into a roll shape such that the end that had been located on inner circumferential side was located on outer circumferential side, and then the heat treatment in the rolled-up state was performed again on the magnetic recording medium at 60° C. for 10 hours. This allows multiple protrusions on the surface of the back layer to be transferred onto the surface of the magnetic layer, forming multiple depressions on the surface of the magnetic layer.

<Cutting Process>

The magnetic recording medium obtained as described above was cut into ½ inches (12.65 mm) wide to obtain a desired elongated magnetic recording medium (an average thickness of 5.6 µm).

In the magnetic recording medium of Example 1 obtained as described above, the saturation magnetization Mst per unit area in the magnetic layer was 6.1 mA, and the ratio Hrp/Hc was 1.67.

Example 2

In the preparation process of the coating material for forming a magnetic layer, the average particle size of the ε-iron oxide particles was 13 nm. The existence ratio of Co to Fe in the ε-iron oxide particles was Co [at %]/Fe [at %]=0.15 in mole ratio. Accordingly, the mass magnetization σs of the ε-iron oxide particles was 40 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 2 was obtained in the same manner as in Example 1 above.

Example 3

In the preparation process of the coating material for forming a magnetic layer, the average particle size of the ε-iron oxide particles was 19 nm. The existence ratio of Co to Fe in the ε-iron oxide particles was Co [at %]/Fe [at %]=0.15 in mole ratio. Accordingly, the mass magnetization σs of the ε-iron oxide particles was 40 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 3 was obtained in the same manner as in Example 1 above.

Example 4

In the preparation process of the coating material for forming a magnetic layer, the average particle size of the ε-iron oxide particles was 15.5 nm. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Furthermore, in the applying process, the average thickness of the magnetic layer was 60 nm. Except for the above points, a magnetic recording medium of Example 4 was obtained in the same manner as in Example 1 above. It is to be noted that in the thus-obtained magnetic recording medium of Example 4, the saturation magnetization Mst per unit area in the magnetic layer was 4.5 mA.

Example 5

In the preparation process of the coating material for forming a magnetic layer, the average particle size of the ε-iron oxide particles was 15.5 nm. The existence ratio of Co to Fe in the ε-iron oxide particles was Co [at %]/Fe [at %]=0.08 in mole ratio. Accordingly, the mass magnetization σs of the ε-iron oxide particles was 25 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 5 was obtained in the same manner as in Example 1 above. It is to be noted that in the thus-obtained magnetic recording medium of Example 5, the saturation magnetization Mst per unit area in the magnetic layer was 4.7 mA.

Example 6

In the preparation process of the coating material for forming a magnetic layer, the existence ratio of Co to Fe in the ε-iron oxide particles was Co [at %]/Fe [at %]=0.20 in mole ratio. Accordingly, the mass magnetization σs of the ε-iron oxide particles was 50 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 6 was obtained in the same manner as in Example 1 above. It is to be noted that in the thus-obtained magnetic recording medium of Example 6, the saturation magnetization Mst per unit area in the magnetic layer was 7.8 mA.

Example 7

In the preparation process of the coating material for forming a magnetic layer, the average particle size of the ε-iron oxide particles was 15.5 nm. The existence ratio of Co to Fe in the ε-iron oxide particles was Co [at %]/Fe [at %]=0.20 in mole ratio. Accordingly, the mass magnetization σs of the ε-iron oxide particles was 25 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 7 was obtained in the same manner as in Example 1 above. It is to be noted that in the thus-obtained magnetic recording medium of Example 7, the saturation magnetization Mst per unit area in the magnetic layer was 7.8 mA.

Example 8

In the preparation process of the coating material for forming a magnetic layer, the average particle size of the ε-iron oxide particles was 15.2 nm. The existence ratio of Co to Fe in the ε-iron oxide particles was Co [at %]/Fe [at %]=0.16 in mole ratio. Accordingly, the mass magnetization σs of the ε-iron oxide particles was 41 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 8 was obtained in the same manner as in Example 1 above. It is to be noted that in the thus-obtained magnetic recording medium of Example 8, the saturation magnetization Mst per unit area in the magnetic layer was 6.4 mA.

Example 9

In the preparation process of the coating material for forming a magnetic layer, the average particle size of the ε-iron oxide particles was 15.5 nm. The existence ratio of Co to Fe in the ε-iron oxide particles was Co [at %]/Fe [at %]=0.20 in mole ratio. Accordingly, the mass magnetization σs of the ε-iron oxide particles was 50 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 9 was obtained in the same manner as in Example 1 above. It is to be noted that in the thus-obtained magnetic recording medium of Example 9, the saturation magnetization Mst per unit area in the magnetic layer was 7.8 mA.

Example 10

In the preparation process of the coating material for forming a magnetic layer, the average particle size of the ε-iron oxide particles was 15.5 nm. The existence ratio of Co to Fe in the ε-iron oxide particles was Co [at %]/Fe [at %]=0.20 in mole ratio. Accordingly, the mass magnetization σs of the ε-iron oxide particles was 50 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 10 was obtained in the same manner as in Example 1 above. It is to be noted that in the thus-obtained magnetic recording medium of Example 10, the saturation magnetization Mst per unit area in the magnetic layer was 5.8 mA.

Example 11

In the preparation process of the coating material for forming a magnetic layer, the average particle size of the ε-iron oxide particles was 16.2 nm. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Example 11 was obtained in the same manner as in Example 1 above. It is to be noted that in the thus-obtained magnetic recording medium of Example 11, the saturation magnetization Mst per unit area in the magnetic layer was 6.1 mA.

Comparative Example 1

In the preparation process of the coating material for forming a magnetic layer, Zr was not added to the ε-iron oxide particles. Accordingly, the mass magnetization σs of the ε-iron oxide particles was 15 emu/g. Additionally, in the process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Comparative Example 1 was obtained in the same manner as in Example 1 above. It is to be noted that in the thus-obtained magnetic recording medium of Comparative Example 1, the saturation magnetization Mst per unit area in the magnetic layer was 2.3 mA.

Comparative Example 2

In the preparation process of the coating material for forming a magnetic layer, the average particle size of the ε-iron oxide particles was 15.5 nm. In addition, Zr was not added to the ε-iron oxide particles. Accordingly, the mass magnetization σs of the ε-iron oxide particles was 16 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Comparative Example 2 was obtained in the same manner as in Example 1 above. It is to be noted that in the thus-obtained magnetic recording medium of Comparative Example 2, the saturation magnetization Mst per unit area in the magnetic layer was 2.5 mA.

Comparative Example 3

In the preparation process of the coating material for forming a magnetic layer, the average particle size of the ε-iron oxide particles was 15.5 nm. In addition, Zr was not added to the ε-iron oxide particles. Accordingly, the mass magnetization σs of the ε-iron oxide particles was 16 emu/g. Additionally, in the application process, the drying conditions were adjusted, and the coercivity Hc in the thickness direction (perpendicular direction) of the magnetic recording medium and the residual coercivity Hrp measured with use of the pulse magnetic field were set to the values shown in Table 1. Except for the above points, a magnetic recording medium of Comparative Example 3 was obtained in the same manner as in Example 1 above. It is to be noted that in the thus-obtained magnetic recording medium of Comparative Example 3, the saturation magnetization Mst per unit area in the magnetic layer was 4.7 mA.
[Evaluation]

The magnetic recording media of Examples 1 to 11 and Comparative Examples 1 to 3 were subjected to the following evaluation.
(Loop Closure)
Whether or not the M-H loop was closed within a range of −15 kOe to +15 kOe both inclusive was confirmed. In Table 1, "OK" is shown in a case where the M-H loop was closed within the range of −15 kOe to +15 kOe both inclusive, and "NG" is shown in a case where the M-H loop was not closed within the range of −15 kOe to +15 kOe both inclusive.
(In-Plane XRD Peak Detection)
Whether or not the first peak was produced at a position of 32.9° in the diffraction pattern by in-plane X-ray diffraction (with a Cu tube), and whether or not the second peak was produced at a position of 36.6° in the diffraction pattern by in-plane X-ray diffraction (with a Cu tube) were confirmed. In Table 1, OK is shown in each of a case where the first peak was produced at the position of 32.9°, and a case where the second peak was produced at the position of 36.6°.
(SNR)
The SNR (electromagnetic conversion characteristics) of each of the magnetic recording media in a 25° C. environment was measured with use of a ½-inch tape running device (MTS Transport, manufactured by Mountain Engineering II, Inc.) equipped with a recording/reproducing head and a recording/reproducing amplifier. A ring head having a gap length of 0.2 μm was used for a recording head, and a GMR head having a distance between shields of 0.1 μm was used for a reproducing head. A relative speed was 6 m/s. A recording clock frequency was 160 MHz. A recording track width was 2.0 μm. In addition, the SNR was calculated on the basis of a method described in the following literature. Results of such calculation are shown in Table 1 in the form of values relative to the SNR of Comparative Example 3 as being 0 dB.
Y Okazaki: "An Error Rate Emulation System.", IEEE Trans. Man., 31, pp. 3093-3095 (1995)
(Signal Attenuation Amount after Lapse of 10 Years)
Signal attenuation amounts after a lapse of ten years of samples of the respective examples and respective comparative examples were determined as follows. Specifically, a "Tape Head Tester (hereinafter referred to as THT)" manufactured by Micro Physics, Inc. was used. For a recording/reproducing head, a head mounted on a tape drive "TS1140" manufactured by IBM Corporation was used as it is. For measurement, a magnetic tape as a magnetic recording medium was cut into a length of 90 cm, and was formed into a ring shape so that a recording layer of the magnetic tape was located on back side, and thereafter, both ends of the magnetic tape were bonded together on a back surface of the magnetic tape by an adhesive tape. In addition, a silver tape for detection of a tape circumferential position was adhered adjacent to a bonding portion of the magnetic tape. The ring-shaped magnetic tape was mounted on the THT, and thereafter was rotated at a speed of 2 m/sec.
Next, signals of 10 MHz generated with use of a signal generator, "ARBITRARY WAVEFORM GENERATOR AWG2021" manufactured by Tektronix Inc., was recorded on the magnetic tape by one round of the entire tape length with use of an optimum recording current. Subsequently to the recording, from the next round, the signals recorded on the tape were continuously reproduced, and reproduced output was measured by a spectrum analyzer "8591E" manufactured by Hewlett Packard Company. It is to be noted that setting of the spectrum analyzer at that time was as follows: RBW: 1 MHz, VBW: 1 MHz, SWP: 500 msec, points: 400, and a zero span mode. Measurement was performed for 0.4 sec that is equivalent to only a "recording portion" except for a "portion in proximity to the bonding portion of the tape" where sufficient recording was not performed, and an average value T of reproduced output during this time was calculated. Measurement was performed for each round of the tape, and the average value Y of reproduced output in each round was regarded as a reproduced output average value Y(t) in an elapsed time from the end of signal recording (t=0). The measurement was performed until t=100 sec, and results were transmitted to and recorded on a connected personal computer on a timely basis.

The measurement flow described above was performed four times with use of the same magnetic tape, and the values Y(t) obtained by the measurements were averaged for each same elapsed time t to obtain a sequence of Yave(t). The obtained Yave(t) was plotted on a Y axis of a graph, and the elapsed time t was plotted on an X axis of the graph, and an approximate curve was generated from this graph with use of logarithmic approximation. The obtained approximate curve was used to calculate a signal attenuation amount after ten years.

Table 1 provides a summary of configurations and evaluation results of the magnetic recording media in the respective examples and the respective comparative examples.

TABLE 1

| | Element Ratio in ε-Iron Oxide | | | Perpendicular Coercivity | Mass Magnetization | Average Thickness of Magnetic | Magnetic Particle | Residual Coercivity (Pulse Magnetic Field) | Hrp/Hc | Loop Closure | In-plane XRD Peak Detection | | Electromagnetic Conversion Characteristics | Signal Attenuation Amount after Lapse of 10 Years |
| | Co [at %]/ Fe[at %] | Zr [at %]/ Fe [at %] | Mst [mA] | Hc [Oe] | σs [emu/g] | Layer [nm] | Size [mn] | Hrp [Oe] | [—] | | 32.9° | 36.6° | SNR [dB] | [dB] |
|---|---|---|---|---|---|---|---|---|---|---|---|---|---|---|
| Example 1 | 0.14 | 0.05 | 6.1 | 3900 | 39 | 80 | 16.0 | 6500 | 1.67 | OK | OK | OK | 2.5 | −0.12 |
| Example 2 | 0.15 | 0.05 | 6.1 | 4500 | 40 | 80 | 13.0 | 9000 | 2.00 | OK | OK | OK | 3.5 | −0.95 |
| Example 3 | 0.15 | 0.05 | 6.1 | 3500 | 40 | 80 | 19.0 | 5100 | 1.46 | OK | OK | OK | 1.1 | −0.02 |
| Example 4 | 0.14 | 0.05 | 4.5 | 3200 | 39 | 60 | 15.5 | 5400 | 1.69 | OK | OK | OK | 3.3 | −0.20 |
| Example 5 | 0.08 | 0.05 | 4.7 | 4300 | 25 | 80 | 15.5 | 8000 | 1.86 | OK | OK | OK | 2.0 | −0.95 |
| Example 6 | 0.20 | 0.05 | 7.8 | 2150 | 50 | 80 | 16.0 | 3750 | 1.74 | OK | OK | OK | 2.0 | −0.95 |
| Example 7 | 0.20 | 0.05 | 7.8 | 3200 | 50 | 80 | 15.5 | 5300 | 1.66 | OK | OK | OK | 3.5 | −0.10 |
| Example 8 | 0.16 | 0.05 | 6.4 | 3000 | 41 | 80 | 15.2 | 5300 | 1.77 | OK | OK | OK | 3.4 | −0.20 |
| Example 9 | 0.20 | 0.05 | 7.8 | 3000 | 50 | 80 | 15.5 | 5000 | 1.67 | OK | OK | OK | 3.9 | −0.12 |
| Example 10 | 0.20 | 0.05 | 5.8 | 3200 | 50 | 60 | 15.5 | 5000 | 1.56 | OK | OK | OK | 3.8 | −0.10 |
| Example 11 | 0.14 | 0.05 | 6.1 | 6000 | 39 | 80 | 16.2 | 8500 | 1.42 | OK | OK | OK | 2.5 | −0.05 |
| Comparative Example 1 | 0.01 | 0 | 2.3 | 20000 | 15 | 80 | 16.0 | 35000 | 1.75 | NG | OK | OK | 1.3 | −0.03 |
| Comparative Example 2 | 0.01 | 0 | 2.5 | 3800 | 16 | 80 | 15.5 | 8100 | 2.13 | OK | OK | OK | 0.5 | −2.00 |
| Comparative Example 3 | 0.01 | 0 | 4.7 | 3800 | 16 | 150 | 15.5 | 8100 | 2.13 | OK | OK | OK | 0 (Reference) | −2.00 |

As illustrated in Table 1, in Examples 1 to 11, a magnetic layer was included in which the first peak at 32.9° and the second peak at 36.6° were produced in the diffraction pattern by in-plane X-ray diffraction (with a Cu tube), the ratio Hrp/Hc was 2.0 or less, iron oxide was included, and the saturation magnetization Mst per unit area was 4.5 mA or greater. Accordingly, in Examples 1 to 11, favorable results were obtained in both the SNR and the signal attenuation amount.

In particular, in Example 9, extremely favorable results were obtained in both the SNR and the signal attenuation amount. In Example 9, in addition of high saturation magnetization Mst per unit area, the residual coercivity Hrp measured with use of the pulse magnetic field was kept low. This makes it possible to easily write a recording magnetic field on the magnetic layer 13 and to cause steep magnetization reversal in the magnetic layer 13; therefore, it is conceivable that a favorable SNR was obtained.

In Example 2, the magnetic particles were small; therefore, a more favorable SNR was obtained. In addition, in Example 3, relatively large magnetic particles were used; therefore, a favorable result was obtained in the signal attenuation amount.

In Comparative Example 1, the saturation magnetization Mst per unit area was less than 4.5 mA; therefore, deterioration in the SNR was observed.

In Comparative Example 2, the saturation magnetization Mst per unit area was less than 4.5 mA, and the ratio Hrp/Hc exceeded 2.0; therefore, the SNR was insufficient. In addition, deterioration in the signal attenuation amount after a lapse of ten years was also observed.

In Comparative Example 3, the ratio Hrp/Hc exceeded 2.0, and the average thickness of the magnetic layer was relatively thick; therefore, the SNR was insufficient. In addition, deterioration in the signal attenuation amount after a lapse of ten years was also observed.

Although the present disclosure has been described in specific with reference to the embodiments and modification examples thereof, the present disclosure is not limited to the embodiments and the like described above, and may be modified in a variety of ways.

For example, the configurations, methods, processes, shapes, materials, numerical values, and the like described in the above embodiments and modification examples thereof are merely examples, and different configurations, methods, processes, shapes, materials, numerical values, and the like may be used, as necessary. Specifically, the magnetic recording medium of the present disclosure may include components other than the base, the underlayer, the magnetic layer, the back layer, and the barrier layer. In addition, the chemical formulae of the compounds or the like are representative examples, and are not limited to the valences and the like described above as long as the compounds with the same general names are employed.

Further, the configurations, methods, processes, shapes, materials, numerical values, and the like of the above-described embodiments and modification examples thereof may be combined with each other without departing from the spirit of the present disclosure.

Further, in the numerical value ranges described in stages herein, the upper limit value or the lower limit value of the numerical value range in any stage may be replaced with the upper limit value or the lower limit value of the numerical value range in another stage. Unless otherwise specified, the materials exemplified herein may be used alone, or two or more thereof may be used in combination.

As described above, according to the magnetic recording medium of one embodiment of the present disclosure, it is possible to achieve both an improvement in electromagnetic conversion characteristics and ensuring of high long-term reliability.

It is to be noted that the effect of the present disclosure is not limited thereto, and may be any effects described herein. Further, the present technology may have the following configurations.

(1)

A magnetic recording medium including a magnetic layer; and a base, in which the magnetic layer includes magnetic powders including ε-iron oxide, a ratio (Hrp/Hc) of residual coercivity (Hrp) measured in a perpendicular direction of the magnetic recording medium with use of a pulse magnetic field to perpendicular coercivity (Hc) of the magnetic recording medium is 2.0 or less, and saturation magnetization (Mst) per unit area of the magnetic recording medium is 4.5 mA or greater.

(2)

The magnetic recording medium according to (1), in which a first peak at 32.9° and a second peak at 36.6° are produced in a diffraction pattern by in-plane X-ray diffraction (with a Cu tube).

(3)

The magnetic recording medium according to (1), in which an average thickness of the magnetic layer is 80 nm or less.

(4)

The magnetic recording medium according to any one of (1) to (3), in which the perpendicular coercivity is 2000 Oe or greater and 6000 Oe or less.

(5)

The magnetic recording medium according to any one of (1) to (3), in which the perpendicular coercivity is 2500 Oe or greater and 4500 Oe or less.

(6)

The magnetic recording medium according to any one of (1) to (5), in which mass magnetization of the magnetic powders is 30 emu/g or greater and 60 emu/g or less.

(7)

The magnetic recording medium according to any one of (1) to (6), in which an average particle diameter of the magnetic powders is 20 nm or less.

(8)

The magnetic recording medium according to any one (1) to (7), in which the ε-iron oxide includes zirconium (Zr) and cobalt (Co).

(9)

The magnetic recording medium according to any one of (1) to (8), in which a magnetization curve (M-H loop) representing a relationship between magnetization and a magnetic field in the magnetic layer is closed within a range from −15 kOe to +15 kOe both inclusive.

(10)

The magnetic recording medium according to (8), in which a mole ratio of cobalt in the ε-iron oxide is 3 atom % or greater and 20 atom % or less relative to atom % of a combination of iron (Fe) and cobalt taken as 100.

(11)

The magnetic recording medium according to (8), in which a mole ratio of zirconium in the ε-iron oxide is 1 atom % or greater and 8 atom % or less relative to atom % of a combination of iron (Fe) and zirconium taken as 100.

This application claims the benefit of Japanese Priority Patent Application JP2020-007832 filed with the Japan Patent Office on Jan. 21, 2020, the entire contents of which are incorporated herein by reference.

It should be understood that those skilled in the art would make various modifications, combinations, sub-combinations, and alterations depending on design requirements and other factors, and they are within the scope of the attached claims or the equivalents thereof.

The invention claimed is:

1. A magnetic recording medium including a magnetic layer and a base, wherein the magnetic layer includes magnetic powders including an ε-iron oxide particle that includes an ε-iron oxide, a ratio (Hrp/Hc) of a residual coercivity (Hrp) measured in a perpendicular direction of the magnetic recording medium with use of a pulse magnetic field to a perpendicular coercivity (Hc) of the magnetic recording medium is from 1.56 to 2.0, saturation magnetization (Mst) per unit area of the magnetic recording medium is 7.8 mA or greater, a first peak at 32.9° and a second peak at 36.6° are produced in a diffraction pattern by in-plane X-ray diffraction (with a Cu tube) of the magnetic recording medium, the ε-iron oxide particle has a core-shell structure and further includes zirconium (Zr) and cobalt (Co), and wherein the perpendicular coercivity (Hc) is 2000 Oe or greater and 6000 Oe or less.

2. The magnetic recording medium according to claim 1, wherein an average thickness of the magnetic layer is 80 nm or less.

3. The magnetic recording medium according to claim 1, wherein the perpendicular coercivity (Hc) is 2500 Oe or greater and 4500 Oe or less.

4. The magnetic recording medium according to claim 1, wherein mass magnetization of the magnetic powders is 30 emu/g or greater and 60 emu/g or less.

5. The magnetic recording medium according to claim 1, wherein an average particle diameter of the magnetic powders is 20 nm or less.

6. The magnetic recording medium according to claim 1, wherein a magnetization curve (M-H loop) representing a relationship between magnetization and a magnetic field in the magnetic layer is closed within a range from −15 kOe to +15 kOe both inclusive.

7. The magnetic recording medium according to claim 1, wherein a mole ratio of cobalt (Co) in the ε-iron oxide particle is 3 atom % or greater and 20 atom % or less relative to atom % of a combination of iron (Fe) and cobalt (Co) taken as 100.

8. The magnetic recording medium according to claim 1, wherein a mole ratio of zirconium (Zr) in the ε-iron oxide particle is 1 atom % or greater and 8 atom % or less relative to atom % of a combination of iron (Fe), cobalt (Co) and zirconium (Zr) taken as 100.

9. The magnetic recording medium according to claim 1, wherein the ratio (Hrp/Hc) of the residual coercivity (Hrp) measured in the perpendicular direction of the magnetic recording medium with use of a pulse magnetic field to the perpendicular coercivity (Hc) of the magnetic recording medium is from 1.67 to 2.0.

10. The magnetic recording medium according to claim 1, wherein the core-shell structure of the ε-iron oxide particle includes a core portion and a shell portion.

11. The magnetic recording medium according to claim 10, wherein the core portion includes the ε-iron oxide, zirconium (Zr) and cobalt (Co).

12. The magnetic recording medium according to claim 11, wherein a mole ratio of cobalt (Co) in the ε-iron oxide particle is 3 atom % or greater and 20 atom %, and wherein a mole ratio of zirconium (Zr) in the ε-iron oxide particle is 1 atom % or greater and 8 atom % or less relative to atom % of a combination of iron (Fe), cobalt (Co) and zirconium (Zr) taken as 100.

13. The magnetic recording medium according to claim 12, wherein the shell portion includes a first shell portion and a second shell portion.

14. The magnetic recording medium according to claim 13, wherein the first shell portion includes a soft magnetic material, and wherein the second shell portion includes an oxide material serving as an antioxidant material.

* * * * *